(12) United States Patent
Brasseur et al.

(10) Patent No.: US 7,326,874 B2
(45) Date of Patent: Feb. 5, 2008

(54) VENTED SHIELD SYSTEM FOR A PLASMA ARC TORCH

(75) Inventors: Jonathan Brasseur, Cornish, NH (US); Kevin D. Horner-Richardson, Cornish, NH (US); Roger W. Hewett, Plainfield, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 8 days.

(21) Appl. No.: 10/899,259

(22) Filed: Jul. 26, 2004

(65) Prior Publication Data
US 2005/0000948 A1    Jan. 6, 2005

Related U.S. Application Data

(63) Continuation of application No. 10/376,688, filed on Feb. 27, 2003, now Pat. No. 6,914,211.

(51) Int. Cl.
*H05B 1/02*    (2006.01)

(52) U.S. Cl. .............................. 219/121.5; 219/121.51; 219/121.48; 219/121.59; 219/121.39; 219/75

(58) Field of Classification Search ........... 219/121.39, 219/121.59, 121.49, 121.5, 121.51, 121.55, 219/121.52, 74, 75, 121.48; 313/231.31, 313/231.41
See application file for complete search history.

(56) References Cited

U.S. PATENT DOCUMENTS

| | | | | |
|---|---|---|---|---|
| 4,861,962 A | * | 8/1989 | Sanders et al. | 219/121.5 |
| 4,924,060 A | * | 5/1990 | Delzenne | 219/121.48 |
| 4,954,683 A | * | 9/1990 | Hatch | 219/121.5 |
| 5,856,647 A | * | 1/1999 | Luo | 219/121.5 |
| 6,069,339 A | * | 5/2000 | McGrath et al. | 219/121.44 |
| 6,268,583 B1 | * | 7/2001 | Yamaguchi et al. | 219/121.52 |
| 2001/0025833 A1 | * | 10/2001 | Kelkar et al. | 219/121.5 |

* cited by examiner

*Primary Examiner*—Mark Paschall
(74) *Attorney, Agent, or Firm*—Brinks Hofer Gilson & Lione

(57) ABSTRACT

Vented shield systems for plasma arc torches are provided that comprise a shield cup body defining a distal end portion, a vented retainer secured to the distal end portion of the shield cup body, and a shield cap secured to the vented retainer. The vented retainer defines at least one vent passageway that directs a flow of secondary gas inward toward the shield cap, and the vented shield system blocks at least a portion of molten metal from contacting components, such as a tip or nozzle, of the plasma arc torch. The shield cap may comprise a mechanized cap, a drag cap, a gouging cap, or a deflector cap, among others. Accordingly, various shield caps may be employed without removal or replacement of the vented retainer. The same vented retainer may be used throughout a variety of plasma arc torch applications.

7 Claims, 32 Drawing Sheets

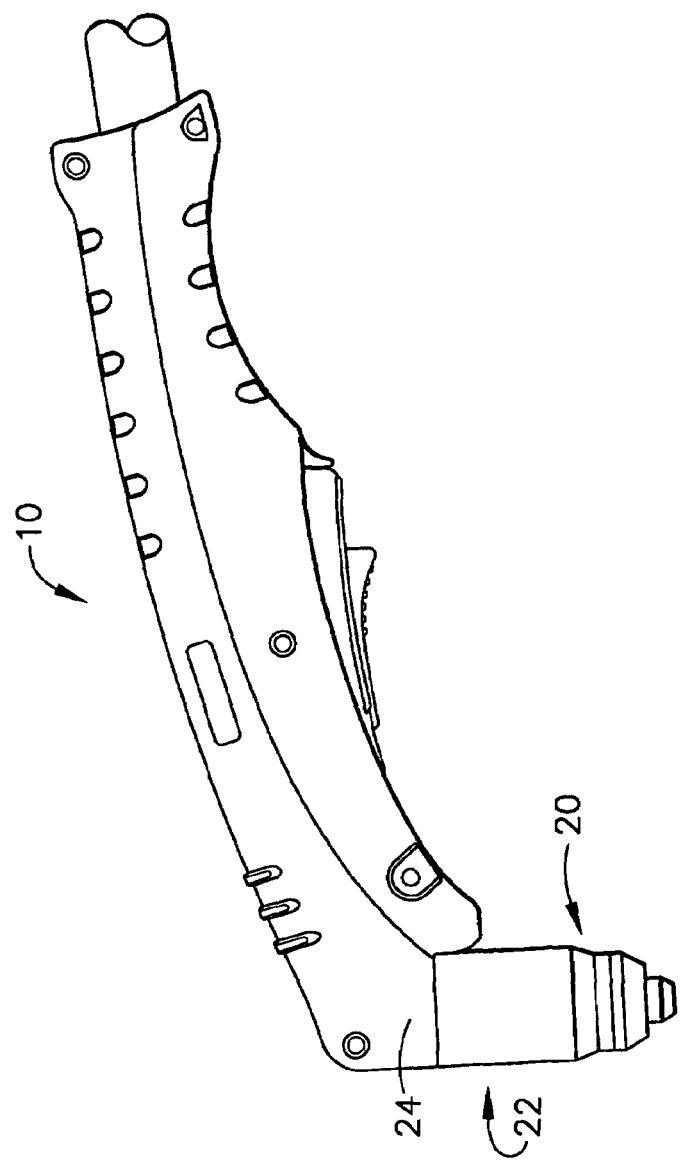
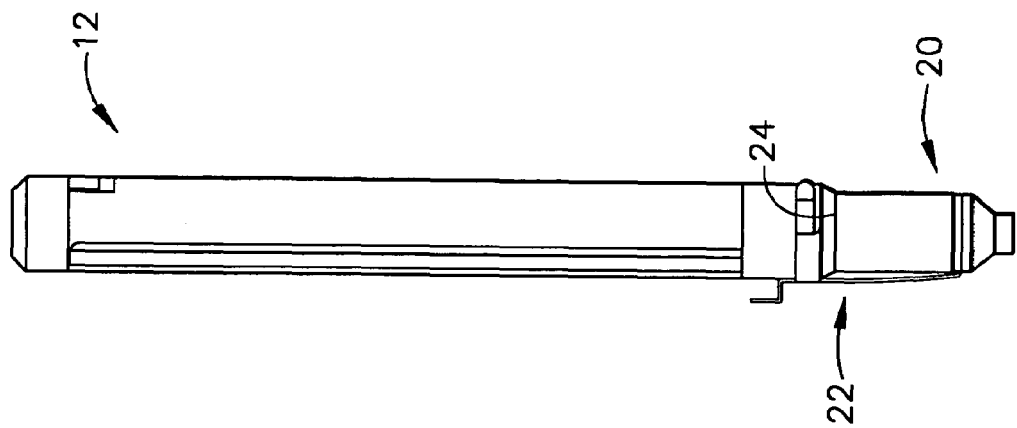
FIG. 1A
FIG. 1B

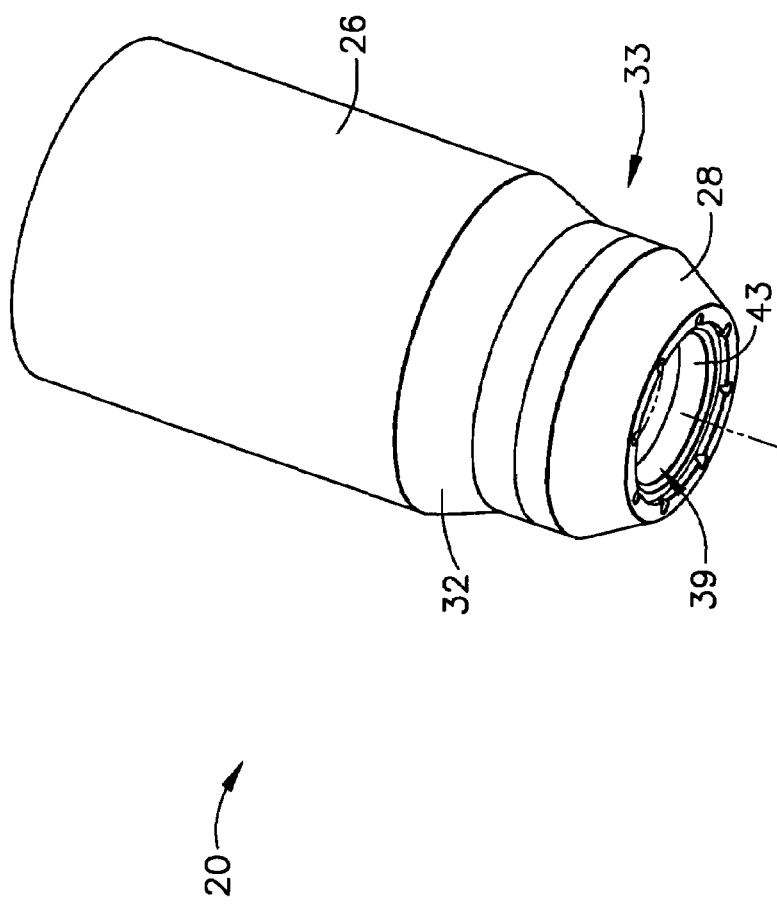
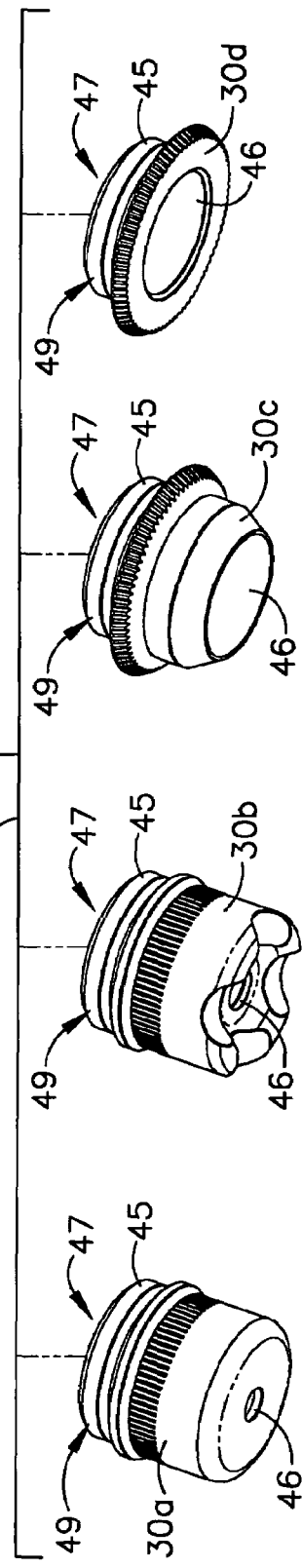
FIG. 2

(SEC. A-A)

(DETAIL B)

(SEC. C-C)

(DETAIL D)

(SEC. E-E)

(DETAIL F)

(SEC. G-G)

(DETAIL H)

VENTED SHIELD SYSTEM FOR A PLASMA ARC TORCH

CROSS-REFERENCE TO RELATED APPLICATIONS

The present application is a continuation U.S. application Ser. No. 10/376,688, titled "Vented Shield System for a Plasma Arc Torch," filed Feb. 27, 2003 now U.S. Pat. No. 6,914,211.

FIELD OF THE INVENTION

The present invention relates generally to plasma arc torches and more particularly to devices and methods for venting secondary gas from plasma arc torches.

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Further, the ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

In several plasma arc torches, a secondary gas is provided through the plasma arc torch that flows distally around the tip to stabilize the plasma stream exiting the central exit orifice. Additionally, shields are often secured to a plasma arc torch, proximate the tip portion, in order to inhibit molten material from splattering against and damaging components of the plasma arc torch such as the tip or electrode, among others. Accordingly, the secondary gas that is used to stabilize the plasma stream is sometimes vented from the shields for proper operation of the plasma arc torch. Further, many existing shields that include passageways for the venting of a secondary gas cannot be reused as a shield where venting is not desirable during operation of the plasma arc torch. As a result, an operator typically must use a plurality of shields with different plasma arc torches and applications.

SUMMARY OF THE INVENTION

In one preferred form, the present invention provides a vented shield system for use in a plasma arc torch that comprises a shield cup body defining a distal end portion, a vented retainer secured to the distal end portion of the shield cup body, and a shield cap secured to the vented retainer. Further, the vented retainer defines at least one vent passageway, (preferably a plurality of such passageways), and the shield cap defines a central exit orifice for the exit of a plasma stream and a secondary gas during operation of the plasma arc torch. In operation, the vent passageways direct a flow of vent gas inward toward the shield cap, and the vented shield system blocks at least a portion of molten metal from contacting components of the plasma arc torch such as a tip or nozzle.

In another form of the present invention, the shield cap that is secured to the vented retainer is a mechanized cap, which is used for mechanized plasma arc torch applications. The mechanized cap comprises a proximal end portion secured within a central opening of the vented retainer and a distal face defining a central exit orifice, wherein the vent passageways direct a flow of vent gas inward toward the mechanized cap for cooling, and the mechanized cap blocks molten metal from contacting components of the plasma arc torch, such as a tip, during operation.

In another form of the present invention, the shield cap that is secured to the vented retainer is a drag cap, which is used for drag cutting operations. The drag cap comprises a proximal end portion secured within a central opening of the vented retainer and a distal face defining a central exit orifice and a plurality of channels. In operation, the vent passageways direct a flow of vent gas inward toward the drag cap for cooling, and the channels direct molten metal away from components, such as a tip, of the plasma arc torch during operation. Additionally, the drag cap itself further blocks the molten metal from contacting components of the plasma arc torch during operation.

In yet another form of the present invention, the shield cap that is secured to the vented retainer is a gouging cap, which is used for gouging operations. The gouging cap comprises a proximal end portion secured within a central opening of the vented retainer, an annular external flange disposed around the proximal end portion, and a central exit orifice. The annular external flange abuts a distal face of the vented retainer to block the vent passageways, and a plasma stream and a secondary gas exit the central exit orifice during gouging operations of the plasma arc torch. Additionally, the gouging cap itself blocks at least a portion of molten metal from contacting components of the plasma arc torch, such as a tip, during operation.

An additional form of the present invention comprises a deflector cap as the shield cap that is secured to the vented retainer. The deflector cap comprises a proximal end portion secured within a central opening of the vented retainer, an annular external flange disposed around a distal end portion of the deflector cap, and a central exit orifice. The annular external flange abuts a distal face of the vented retainer to block the vent passageways, and a plasma stream and a secondary gas exit the central exit orifice during operation of the plasma arc torch. Additionally, the deflector cap itself blocks at least a portion of molten metal from contacting components of the plasma arc torch, such as a tip, during operation.

Another form of the present invention comprises a plasma arc torch having a vented shield system and a tip positioned at least partially within the vented shield system. The vented shield system comprises a shield cup body, a vented retainer, and a shield cap that may be one of a mechanized cap, a drag cap, a gouging cap, or a deflector cap as previously described. Accordingly, the vent passageways direct a flow of secondary gas inward toward the shield cap, and the vented shield system blocks at least a portion of molten metal from contacting the tip during operation of the plasma arc torch.

In another aspect of the present invention, a method of operating a plasma arc torch is provided that comprises the steps of directing a flow of vent gas inward, through a first component of the plasma arc torch and toward a second component of the plasma arc torch. Further, the method comprises the step of blocking at least a portion of molten metal from contacting components of the plasma arc torch using the second component.

In yet other forms of the present invention, a plasma arc torch is provided that defines a spacing between the tip and an adjacent shield cap, which is a function of current level and the size of the central exit orifice of the adjacent shield cap. The spacing provides for optimal performance of the plasma arc torch for a plurality of applications.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a view illustrating a manually operated plasma arc torch in accordance with the principles of the present invention;

FIG. 1B is a view illustrating an automated or mechanized plasma arc torch in accordance with the principles of the present invention;

FIG. 2 is a perspective view of a vented shield system having a plurality of shield cap configurations and constructed in accordance with the principles of the present invention;

Corresponding reference numerals indicate corresponding parts throughout the several views of the drawings.

DETAILED DESCRIPTION OF THE PREFERRED EMBODIMENTS

Figure 3:
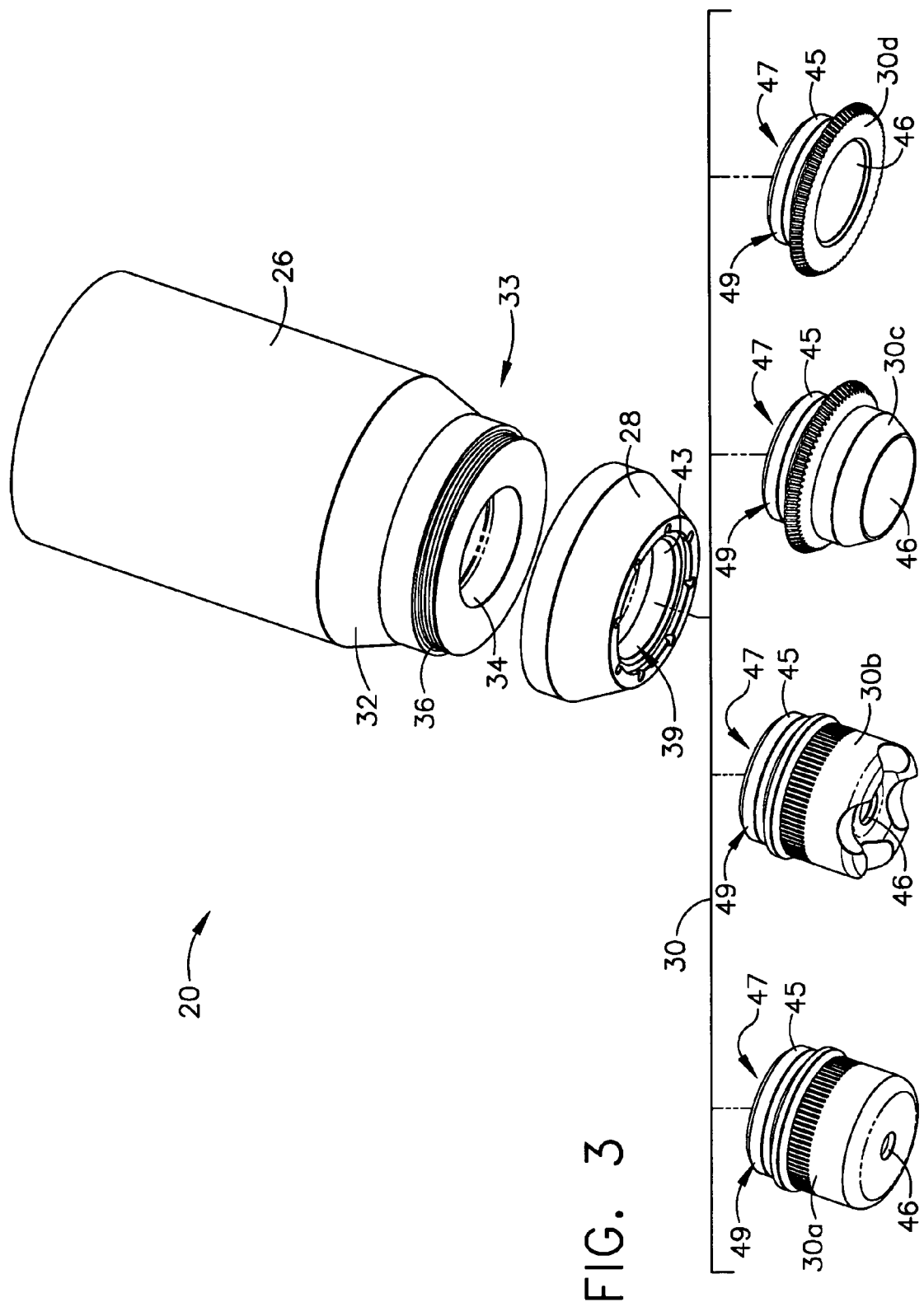
FIG. 3 is an exploded perspective view of the vented shield system with the plurality of shield cap configurations in accordance with the principles of the present invention.

The following description of the preferred embodiments is merely exemplary in nature and is in no way intended to limit the invention, its application, or uses.

Referring to the drawings, a vented shield system for use in a plasma arc torch is illustrated and generally indicated by reference numeral 20 in FIGS. 1A and 1B. The vented shield system 20 may be employed on a manually operated plasma arc torch 10 as shown in FIG. 1A or on a mechanized, or automated, plasma arc torch 12 as shown in FIG. 1B. In operation, the vented shield system 20 is disposed around a distal end portion 22 of a plasma arc torch head 24 and functions to block molten metal from splattering against components of a plasma arc torch while venting portions of a secondary gas in certain forms of the present invention as described in greater detail below. The portion of secondary gas that is vented to atmosphere is herein referred to as a vent gas.

Referring also to FIGS. 2 and 3, the vented shield system 20 comprises a shield cup body 26, a vented retainer 28, and a shield cap 30, wherein the shield cap 30 may comprise one of a variety of shield caps that are used for various plasma arc torch applications. The shield caps according to the preferred embodiments of the present invention comprise a mechanized cap 30a, a drag cap 30b, a gouging cap 30c, and a deflector cap 30d as shown, each of which is described in greater detail below. The shield cup body 26 is disposed around the distal end portion 22 of the plasma arc torch head 24 and is preferably secured thereto using a threaded connection. The shield cup body 26 preferably defines a cylindrical configuration having an angled sidewall 32. The angled sidewall 32 reduces the overall width of the shield cup body 26 and thus allows an operator to use the plasma arc torch in more confined spaces such as when certain tooling or jigs are used to hold a workpiece. The shield cup body 26 further comprises a distal end portion 33 having a central opening 34, wherein certain consumables such as a tip (not shown) are disposed. Preferably, the distal end portion 33 defines external threads 36 that are used to engage and secure the vented retainer 28 in one form of the present invention.

Figure 4:
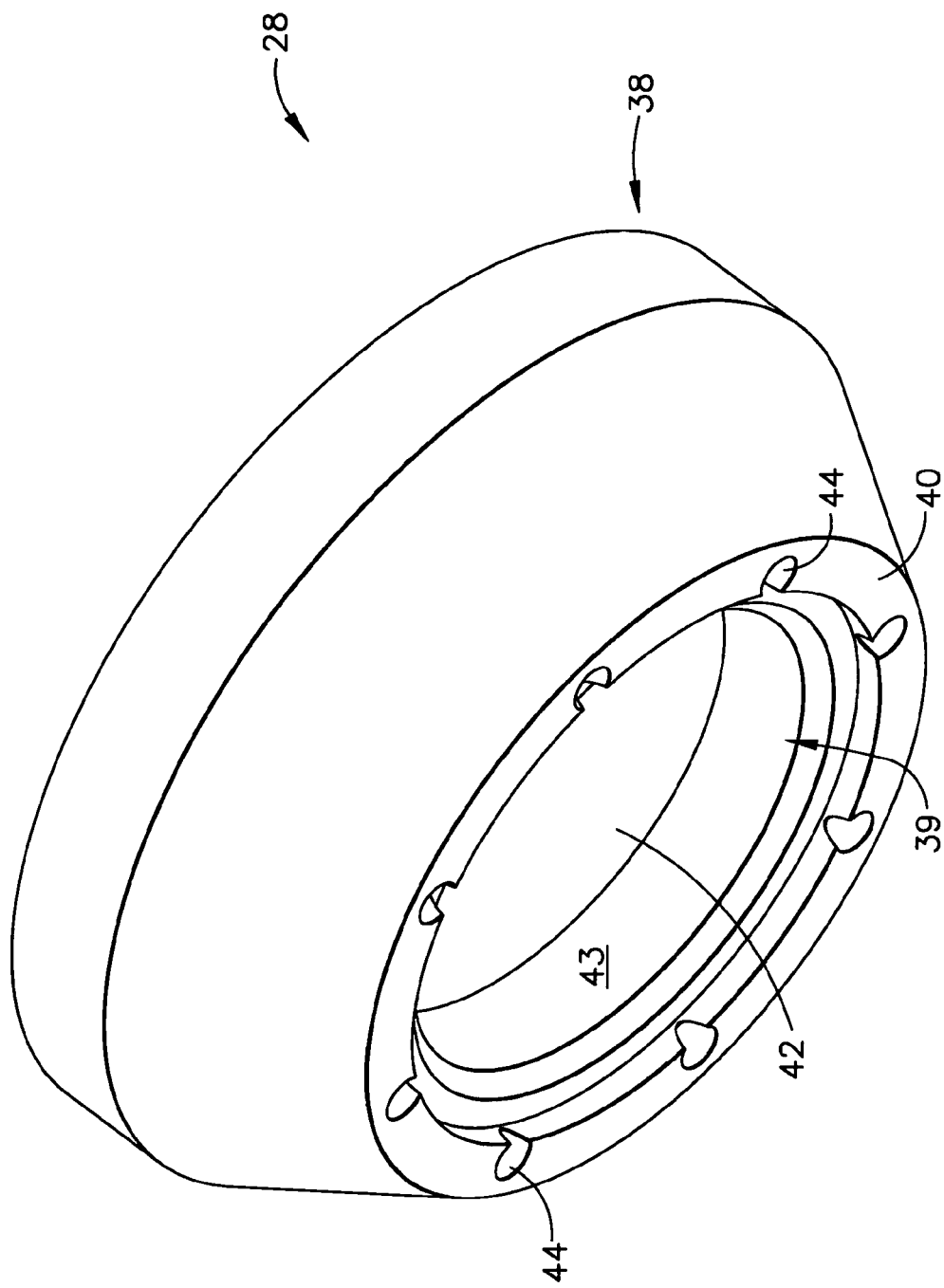
FIG. 4 is a perspective view of a vented retainer constructed in accordance with the teachings of the present invention.
Figure 5:
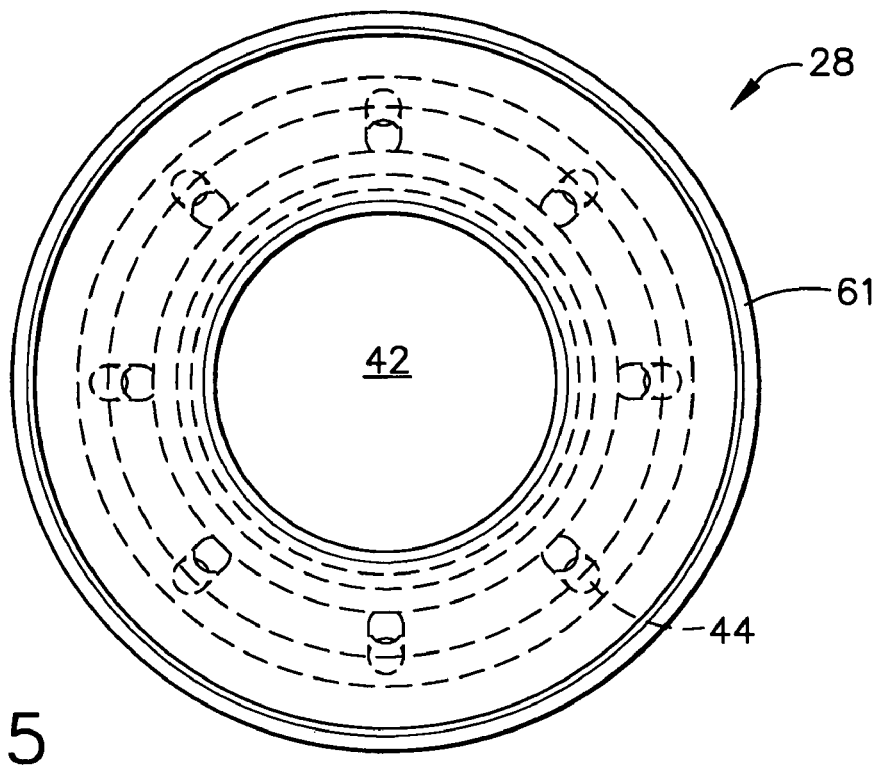
FIG. 5 is a top view of the vented retainer in accordance with the principles of the present invention.
Figure 6:
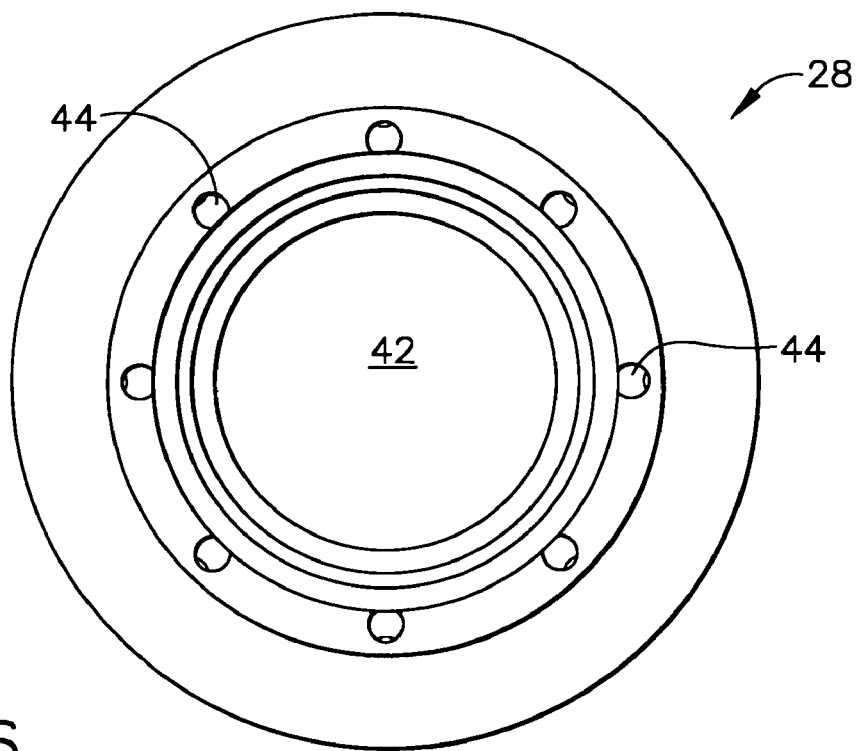
FIG. 6 is a bottom view of the vented retainer in accordance with the principles of the present invention.
Figure 7:
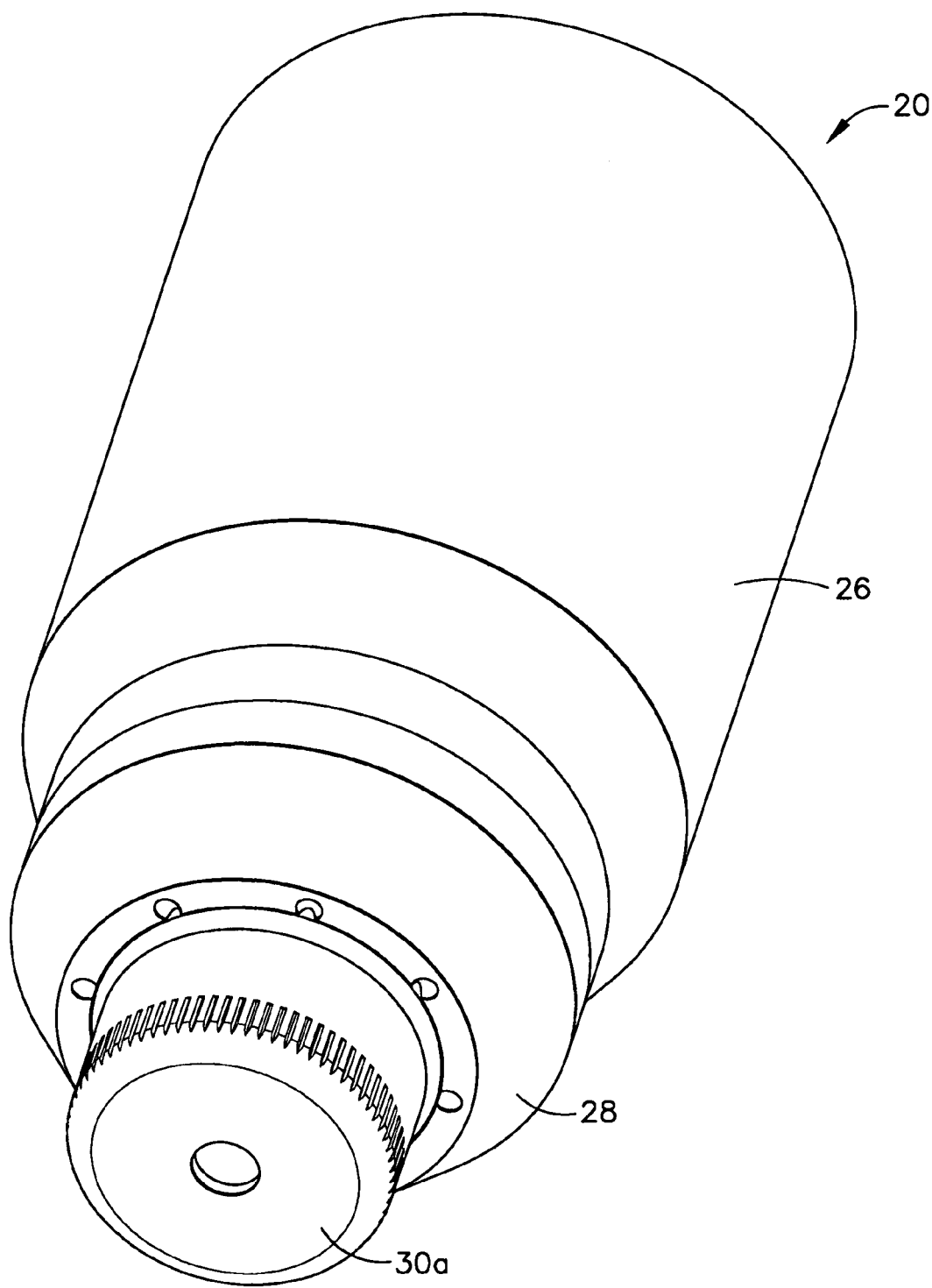
FIG. 7 is a perspective view of a vented shield system with a mechanized cap constructed in accordance with the principles of the present invention.
Figure 8:
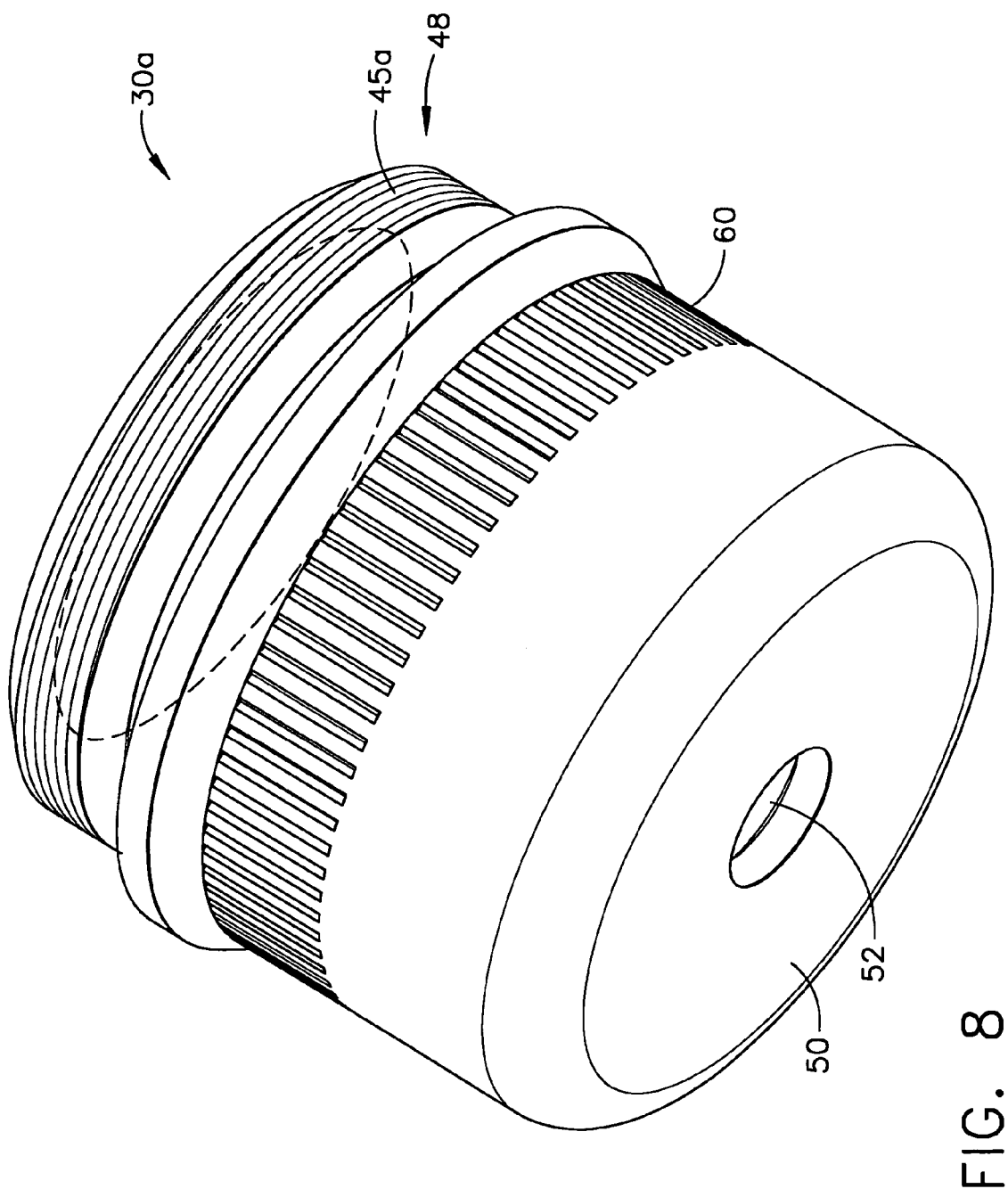
FIG. 8 is a perspective view of the mechanized cap constructed in accordance with the principles of the present invention.
Figure 9:
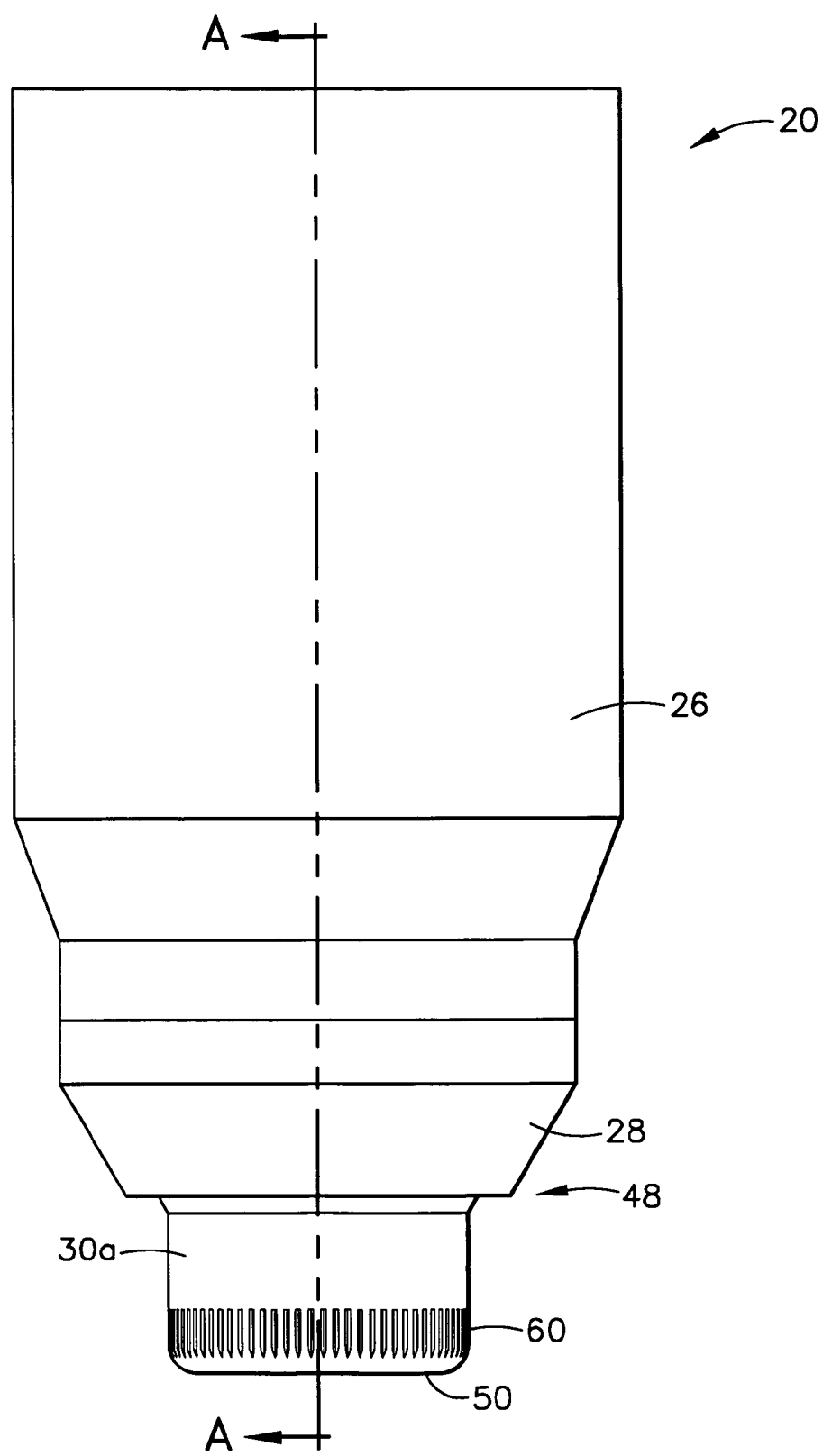
FIG. 9 is a side view of the vented shield system having a mechanized cap in accordance with the principles of the present invention.

Referring now to FIGS. 4-6, the vented retainer 28 defines a proximal end portion 38 and a distal face 40. Preferably, the vented retainer 28 is co-molded with or molded onto the shield cup body 26. Alternately, the proximal end portion 38 defines internal threads 41 that engage the external threads 36 of the shield cup body 26 to secure the vented retainer 28 to the shield cup body 26. As further shown, a central opening 42 is formed through the distal face 40 of the vented retainer 28. The central opening 42 comprises an attachment area 39 for the attachment of the shield cap 30. In the preferred form of the present invention, the attachment area 39 defines internal threads 43 for securing the shield cap 30, although other known methods for securing the shield cap 30 may also be employed while remaining within the scope of the present invention. The central opening 42 also accommodates certain consumables that are disposed within the torch head 24 such as a tip, which is described in greater detail below.

As further shown, a plurality of vent passageways 44 are formed through the distal face 40 and are angled inward, toward the center of the vented retainer 28. Accordingly, the vent passageways 44 are used to direct a flow of vent gas toward the shield cap 30 in certain forms of the present invention for improved cooling as described in greater detail below. Although a plurality of vent passageways 44 are shown, one or more of vent passageways may be employed while remaining within the scope of the present invention. Preferably, the vented retainer 28 is formed of a copper material, although other materials that are durable and that can withstand molten metal splatter may also be used while remaining within the scope of the present invention.

Referring back to FIGS. 2 and 3, the shield cap 30 is secured to the vented retainer 28 and defines a central exit orifice 46 that accommodates the exit of a plasma stream and a secondary gas during operation of the plasma arc torch and also certain consumable components disposed within the torch head 24. As shown, the shield cap 30 comprises a proximal end portion 47 that defines an external attachment area 49. In the preferred form of the present invention, the external attachment area 49 defines external threads 45 that engage the internal threads 43 of the vented retainer 28 to secure the shield cap 30 to the vented retainer 28. However, other known methods for securing the shield cap 30 may also be employed while remaining within the scope of the present invention. The shield cap 30 may comprise one of at least four (4) embodiments for different plasma arc torch applications, namely, the mechanized cap 30a, the drag cap 30b, the gouging cap 30c, and the deflector cap 30d. Accordingly, the configuration and operation of each shield cap are further described in the following.

Mechanized Cap

Referring to FIGS. 7 through 11, the mechanized cap 30a is shown secured to the vented retainer 28 of the vented shield system 20. Generally, the mechanized cap 30a is used in applications where the plasma arc torch is operated using mechanized or automated methods rather than manually by an operator. As shown, the mechanized cap 30a comprises a proximal end portion 48 secured within the central opening 42 of the vented retainer 28. Preferably, the proximal end portion 48 defines external threads 45a that engage the internal threads 43 of the vented retainer 28 to secure the mechanized cap 30a to the vented retainer 28. The mechanized cap 30a further comprises a distal face 50 defining a central exit orifice 52, which provides for the exit of a plasma stream and a secondary gas during operation of the plasma arc torch. Moreover, a central cavity 54 (best shown in FIG. 10) is formed within the mechanized cap 30a, which houses and protects certain consumable components of the plasma arc torch as described in greater detail below.

Figure 10:
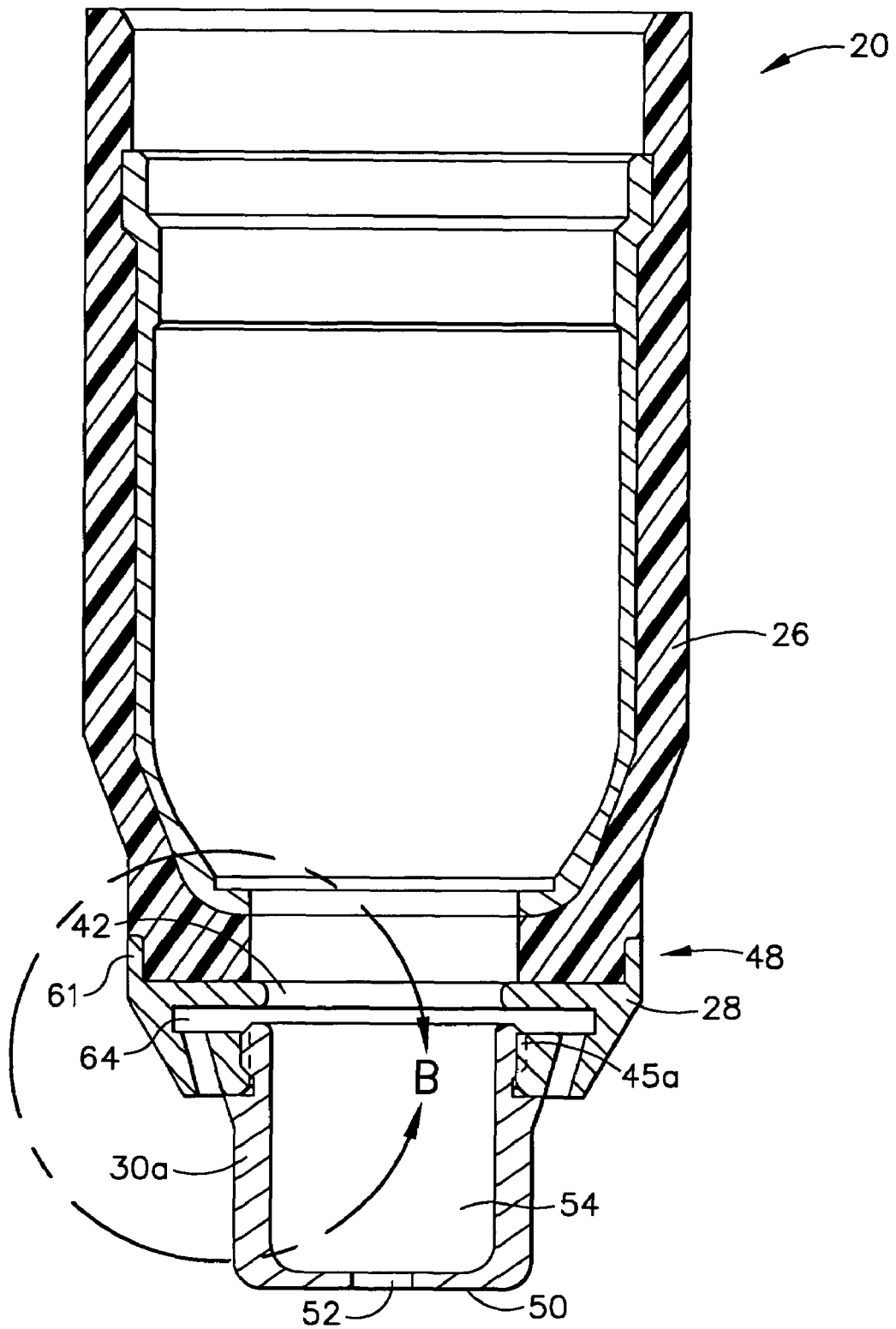
FIG. 10 is a cross-sectional view, taken along the plane of line A-A of FIG. 9, of the vented shield system having a mechanized cap in accordance with the principles of the present invention.
Figure 11:
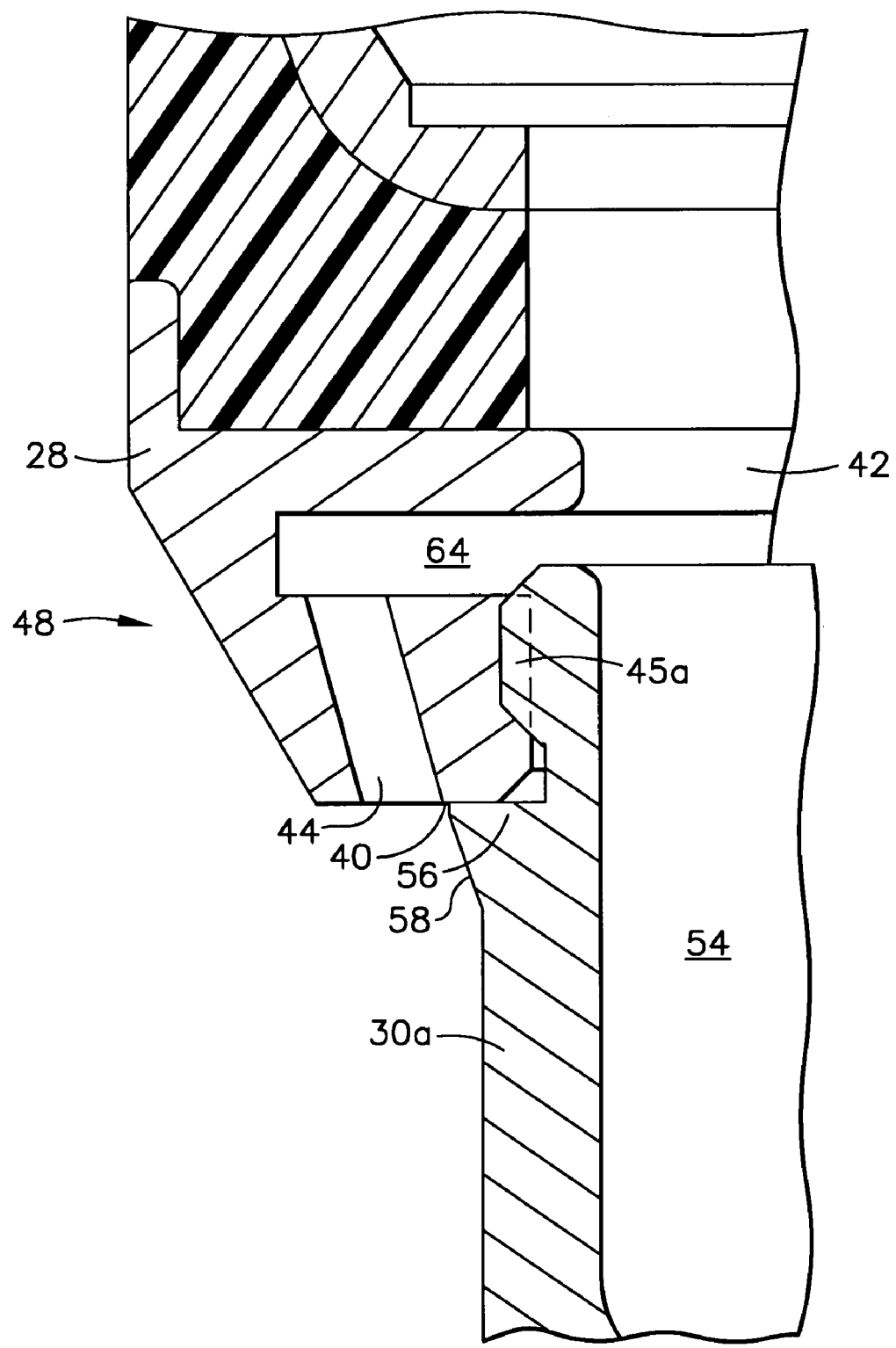
FIG. 11 is an enlarged detail view, taken from region B of FIG. 10, of the vented shield system having a mechanized cap in accordance with the principles of the present invention.

As best shown in FIGS. 10 and 11, the vent passageways 44 of the vented retainer 28 are angled inward toward the mechanized cap 30a. Accordingly, the vent passageways 44 direct a flow of vent gas inward toward the mechanized cap 30a for improved cooling during operation of the plasma arc torch. Further, the proximal end portion 48 of the mechanized cap 30a also defines an external annular flange 56 that abuts the distal face 40 of the vented retainer 28 and an angled sidewall 58 that is substantially aligned with the vent passageways 44 as shown. As a result, the angled sidewall 58 provides a smoother transition of the flow of vent gas through the vent passageways 44 and onto the mechanized cap 30a. Additionally, the mechanized cap 30a preferably defines a knurled surface 60 (FIGS. 7-9) as shown to provide an improved gripping surface for attachment to the vented retainer 28. However, the mechanized cap 30a may have a smooth surface or a different texture surface while remaining within the scope of the present invention. As further shown in FIG. 10, the vented retainer 28 is positioned and secured to the shield cup body 26 via a proximal annular flange 61.

Figure 12:
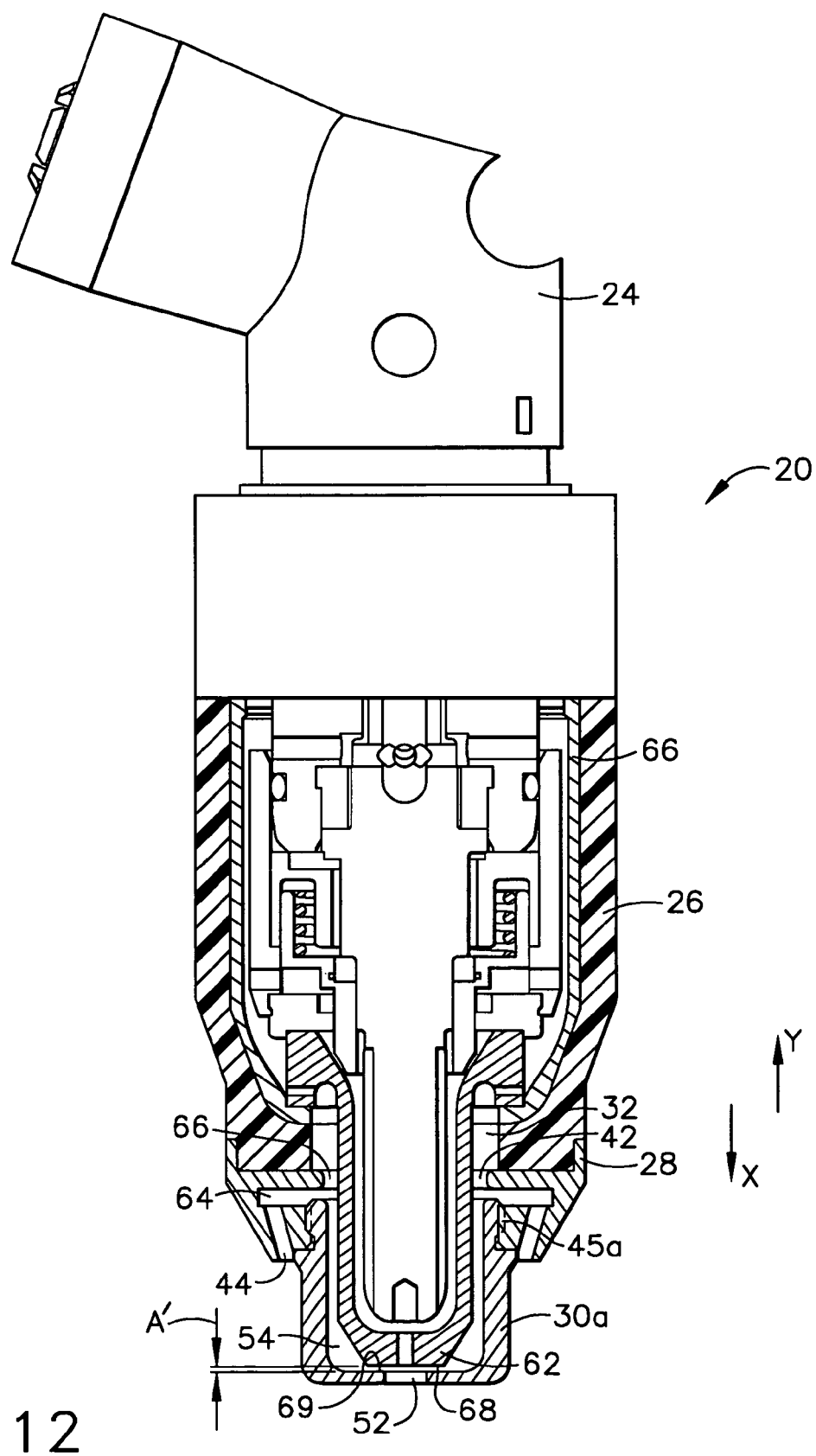
FIG. 12 is a partial sectional view of the vented shield system with a mechanized cap secured to a torch head and constructed in accordance with the principles of the present invention.
Figure 13:
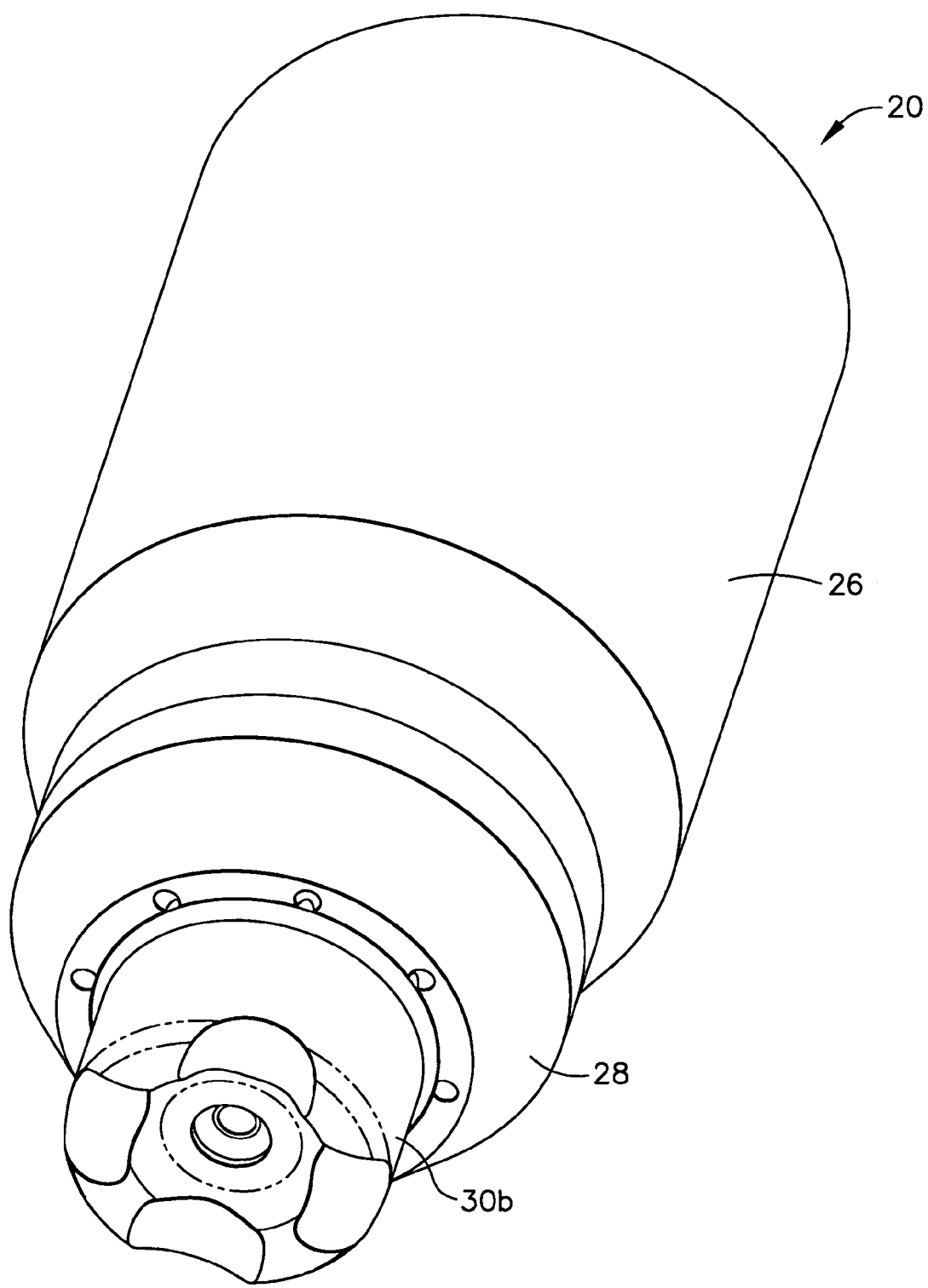
FIG. 13 is a perspective view of a second embodiment of the vented shield system with a drag cap and constructed in accordance with the teachings of the present invention.

Referring now to FIG. 12, the mechanized cap 30a is shown attached to the vented shield system 20, which is secured around a plasma arc torch head 24 having a plurality of consumables disposed therein. Among the consumables is a tip 62, which extends through the central opening 34 of the shield cup body 26, through the central opening 42 of the vented retainer 28, and into the central cavity 54 of the mechanized cap 30a. Accordingly, in operation, the mechanized cap 30a, along with the overall vented shield system 20, blocks molten metal that splatters during operation from contacting the tip 62 and other consumables of the plasma arc torch.

As further shown, the vented retainer 28 comprises an annular undercut 64 that directs a portion of the secondary gas to the vent passageways 44. As shown, a proximal passageway 66 is formed between the central opening 42 of the vented retainer 28 and the tip 62, wherein the secondary gas flow is directed distally during operation of the plasma arc torch. The secondary gas is then directed partially into the annular undercut 64 and partially into the central cavity 54 of the mechanized cap 30a. The portion of secondary gas that flows into the annular undercut 64 is directed through the vent passageways 44 and onto the mechanized cap 30a, as a vent gas, for improved cooling thereof. The other portion of secondary gas that flows into the central cavity 54 continues to flow distally and then through the central exit orifice 52 to stabilize the plasma stream during operation. As used herein, the terms distal direction or distally should be construed to be the direction indicated by arrow X, and the terms proximal direction or proximally are the direction toward arrow Y.

As further shown, the shield cup body 26 further comprises a conductive insert 66 that is used to maintain electrical continuity through the positive, or anodic, potential side of the plasma arc torch 24. Accordingly, the shield cup body 26 is nonconductive and is preferably formed of a polyester material. Further, the conductive insert 66 is preferably a brass material and is co-molded with or molded within the shield cup body 26. As shown, the tip 62 contacts the conductive insert 66 to maintain electrical continuity with other anodic components of the plasma arc torch, which components are not illustrated herein for purposes of clarity. Exemplary operation of a plasma arc torch is shown and described in U.S. Pat. No. 6,163,008, which is commonly assigned with the present application and the contents of which are incorporated herein by reference in their entirety.

As shown in FIG. 12, the distance between a distal face 68 of the tip 62 and an internal face 69 of the mechanized cap 30a is defined by spacing A'. The spacing A' between the distal face 68 of the tip 62 and the internal face 69 of the mechanized cap 30a is critical and is a function of both an operating current level and a diameter of the central exit orifice 52. For example, when the plasma arc torch is operating at 80 amps, the spacing A' is approximately 0.040 in. (0.016 cm) with a central exit orifice diameter of 0.120 (0.047 cm). When the plasma arc torch is operating at 50 amps, the spacing A' is approximately 0.016 in. (0.006 cm) with a central exit orifice diameter of 0.100 (0.039 cm). Further, when the plasma arc torch is operating at 40 amps, the spacing A' is approximately 0.016 in. (0.006 cm) with a central exit orifice diameter of 0.064 (0.025 cm). These values are exemplary for specific operating amperages of a plasma arc torch and should not be construed as limiting the scope of the present invention. Accordingly, different spacings and diameters may be used while remaining within the scope of the present invention as disclosed herein.

Drag Cap

Referring to FIGS. 13 through 18, the drag cap 30b is shown secured to the vented retainer 28 of the vented shield system 20. Generally, the drag cap 30b is used in drag cutting applications where the drag cap 30b is placed directly against a surface of the workpiece during cutting operations. As shown, the drag cap 30b comprises a proximal end portion 70 secured within the central opening 42 of the vented retainer 28. Preferably, the proximal end portion 70 defines external threads 45b that engage the internal threads 43 of the vented retainer 28 to secure the drag cap 30b to the vented retainer 28. The drag cap 30b further comprises a distal face 72 defining a central exit orifice 74, which provides for the exit of a plasma stream and a secondary gas during operation of the plasma arc torch. Moreover, a central cavity 76 (best shown in FIGS. 17-18) is formed within the drag cap 30b, which houses and protects certain consumable components of the plasma arc torch as described in greater detail below.

Figure 14:
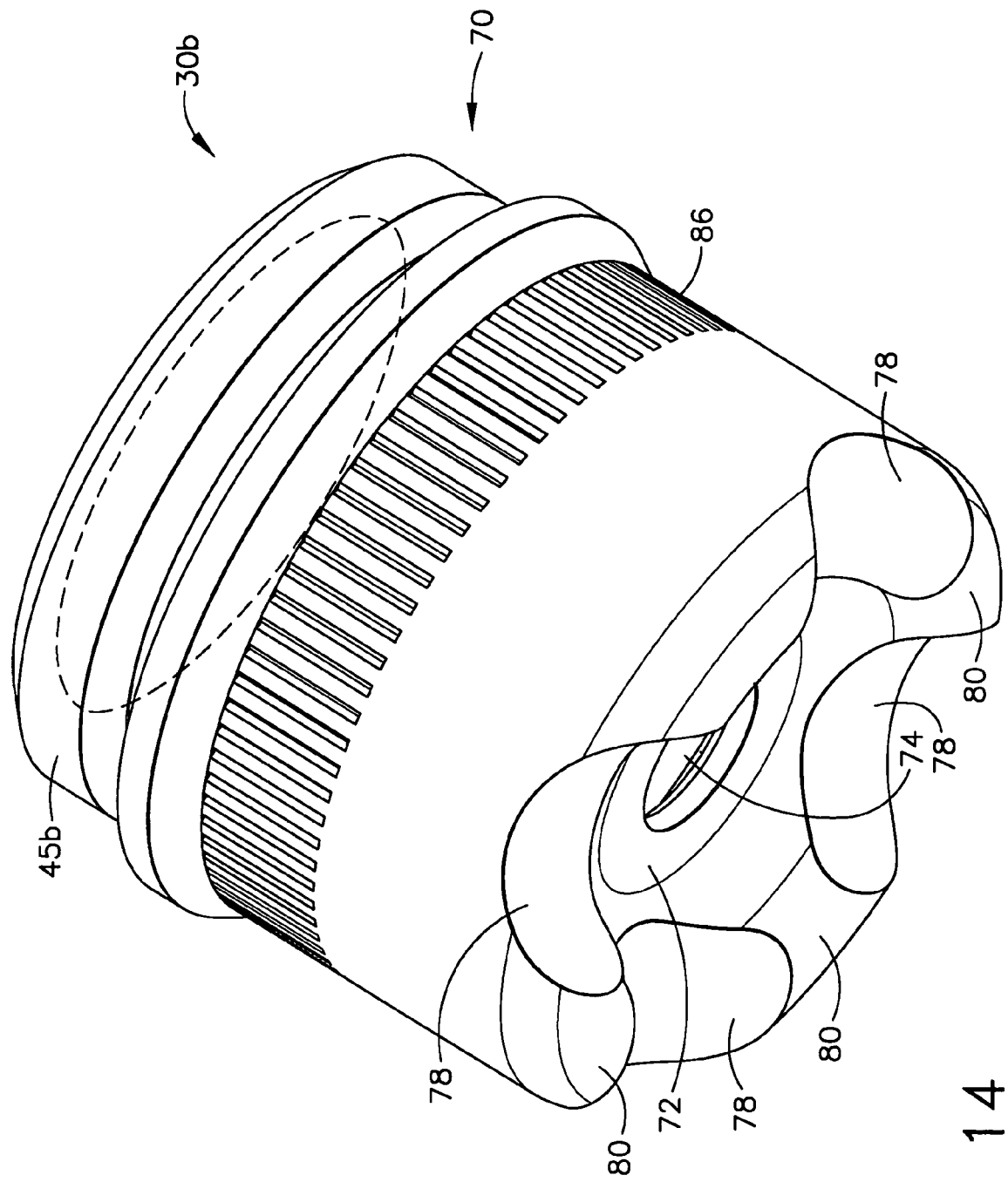
FIG. 14 is a perspective view of the drag cap constructed in accordance with the principles of the present invention.
Figure 15:
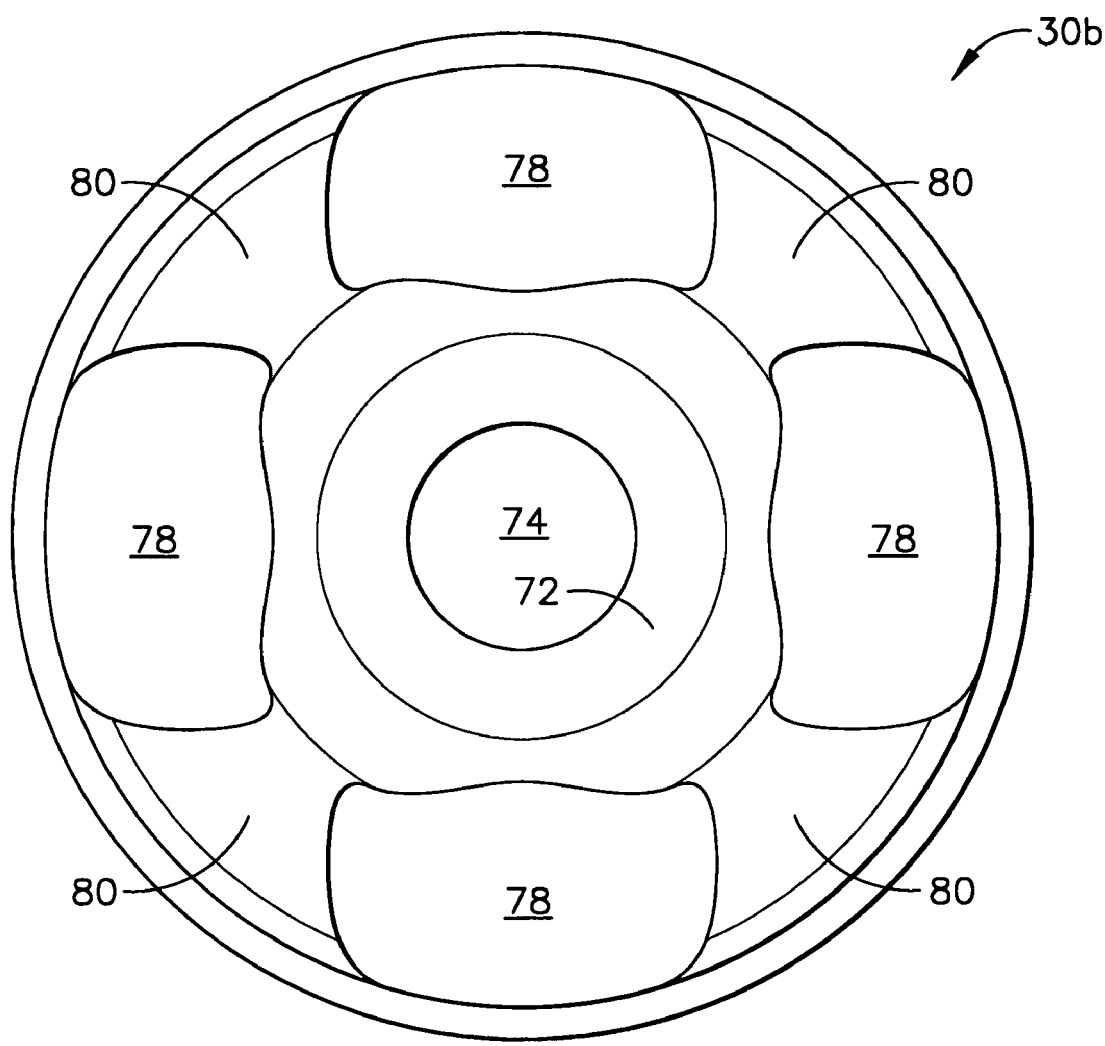
FIG. 15 is an end view of the drag cap in accordance with the principles of the present invention.
Figure 16:
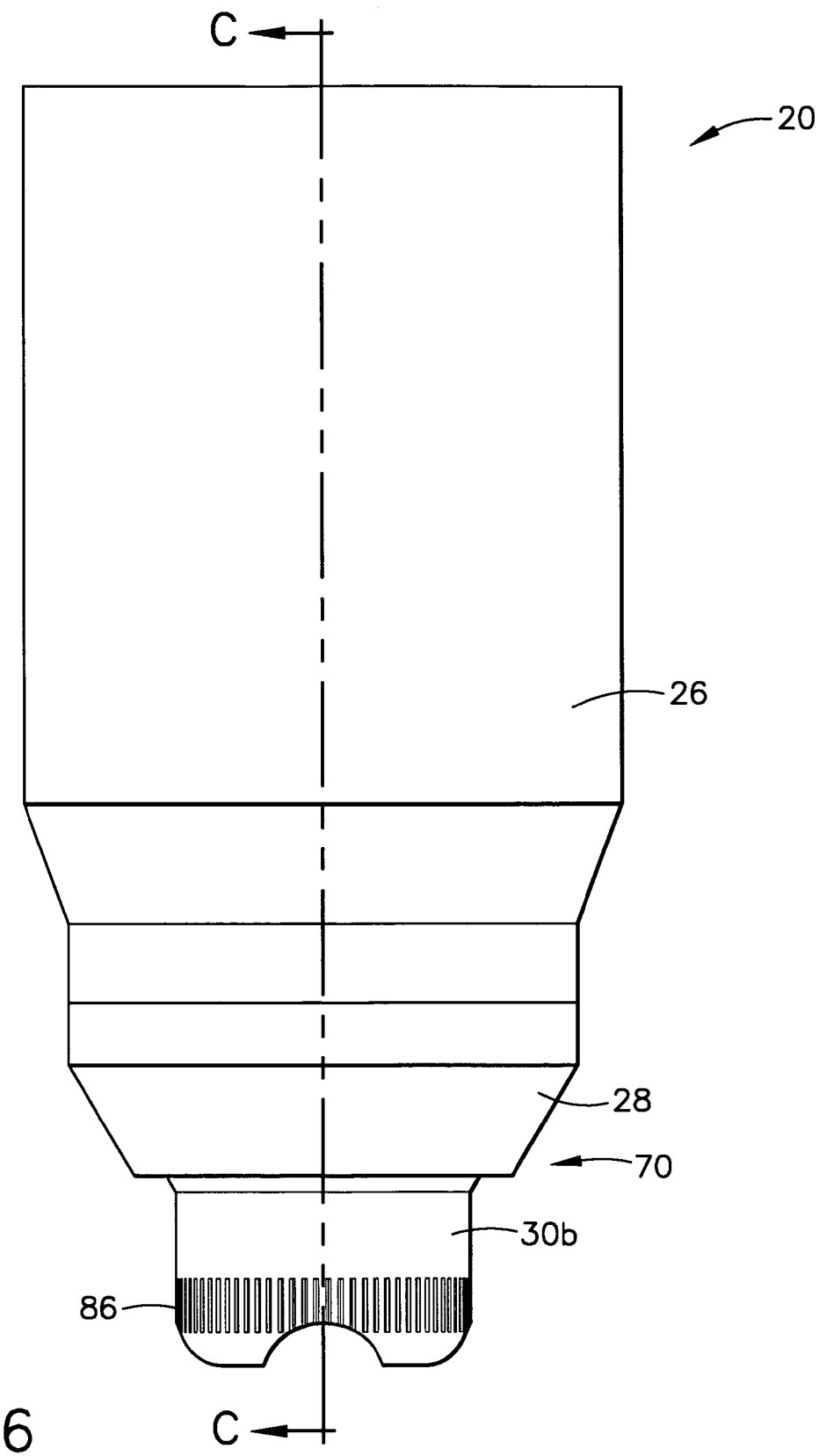
FIG. 16 is a side view of the second embodiment of the vented shield system with a drag cap in accordance with the principles of the present invention.

With reference to FIGS. 14 and 15, the drag cap 30b further comprises a plurality of channels 78 formed on the distal face 72, which are separated by distal extensions 80. In operation, the distal extensions 80 contact the workpiece while the channels 78 provide a passage for the flow of gas and for the flow of molten metal that splatters during cutting operations. Although a plurality of channels 78 are shown, at least one channel or a different number of channels may be employed while remaining within the scope of the present invention.

Figure 17:
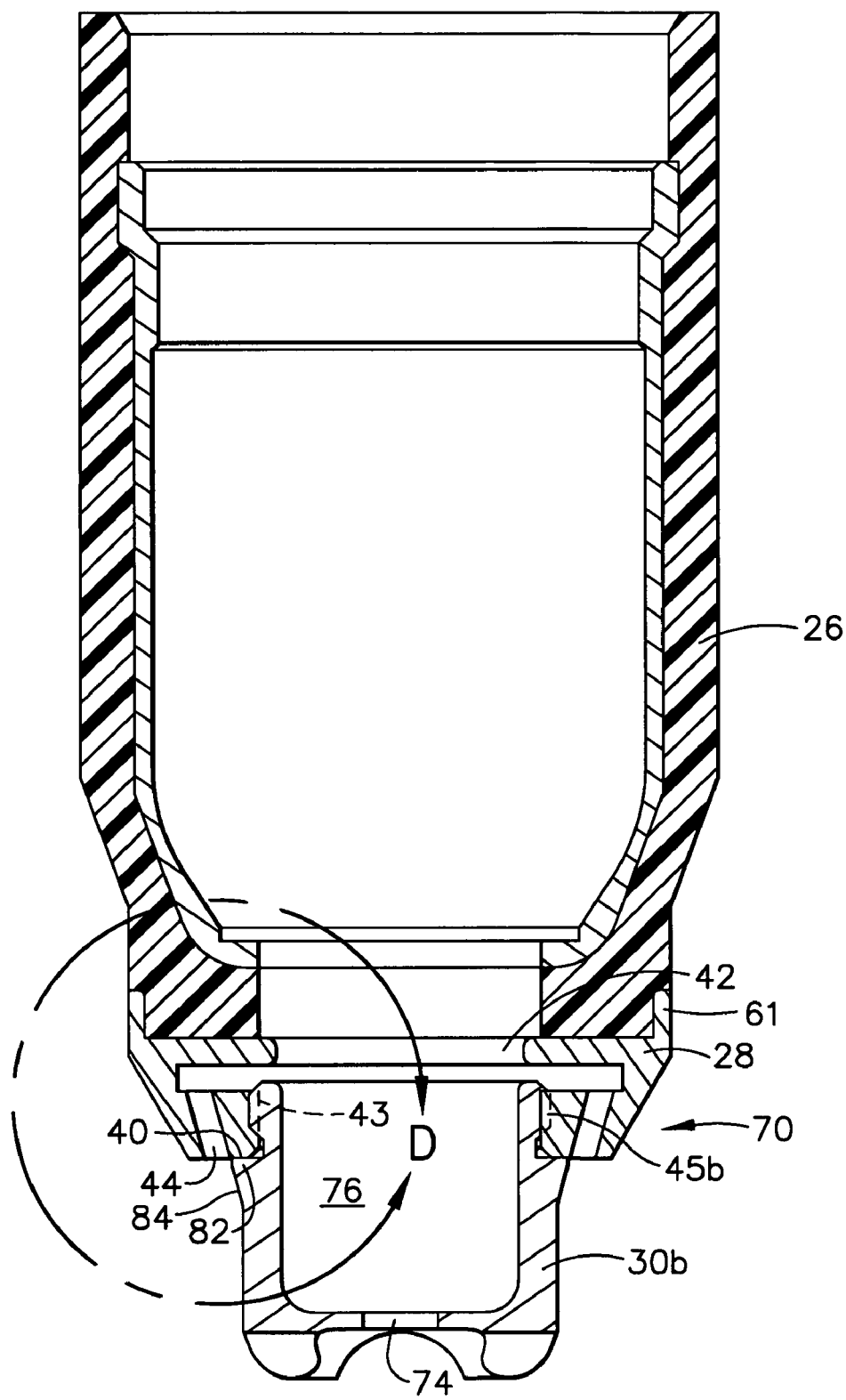
FIG. 17 is a cross-sectional view, taken along the plane of line C-C of FIG. 16, of the second embodiment of the vented shield system with a drag cap in accordance with the teachings of the present invention.
Figure 18:
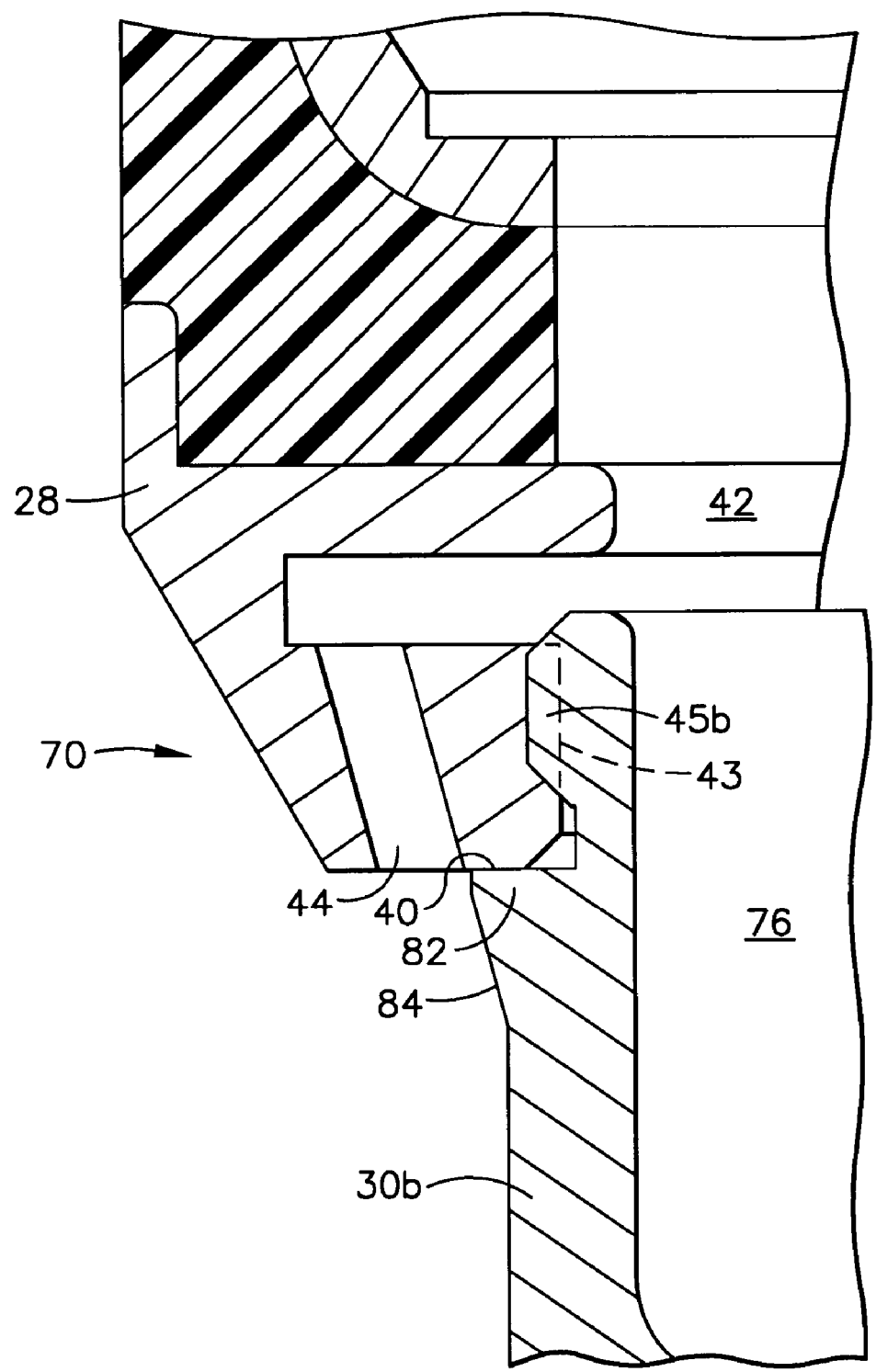
FIG. 18 is an enlarged detail view, taken from region D of FIG. 17, of the second embodiment of the vented shield system with a drag cap in accordance with the principles of the present invention.

As best shown in FIGS. 17 and 18, the vent passageways 44 of the vented retainer 28 are angled inward toward the drag cap 30b. Accordingly, the vent passageways 44 direct a flow of vent gas inward toward the drag cap 30b for improved cooling during operation of the plasma arc torch. Further, the proximal end portion 70 of the drag cap 30b also defines an external annular flange 82 that abuts the distal face 40 of the vented retainer 28 and an angled sidewall 84 that is substantially aligned with the vent passageways 44 as shown. As a result, the angled sidewall 84 provides a smoother transition of the flow of vent gas through the vent passageways 44 and onto the drag cap 30b. Additionally, the drag cap 30b preferably defines a knurled surface 86 (FIGS. 13, 14, 16) as shown to provide an improved gripping surface for attachment to the vented retainer 28. However, the drag cap 30b may have a smooth surface or a different texture surface while remaining within the scope of the present invention.

Figure 19:
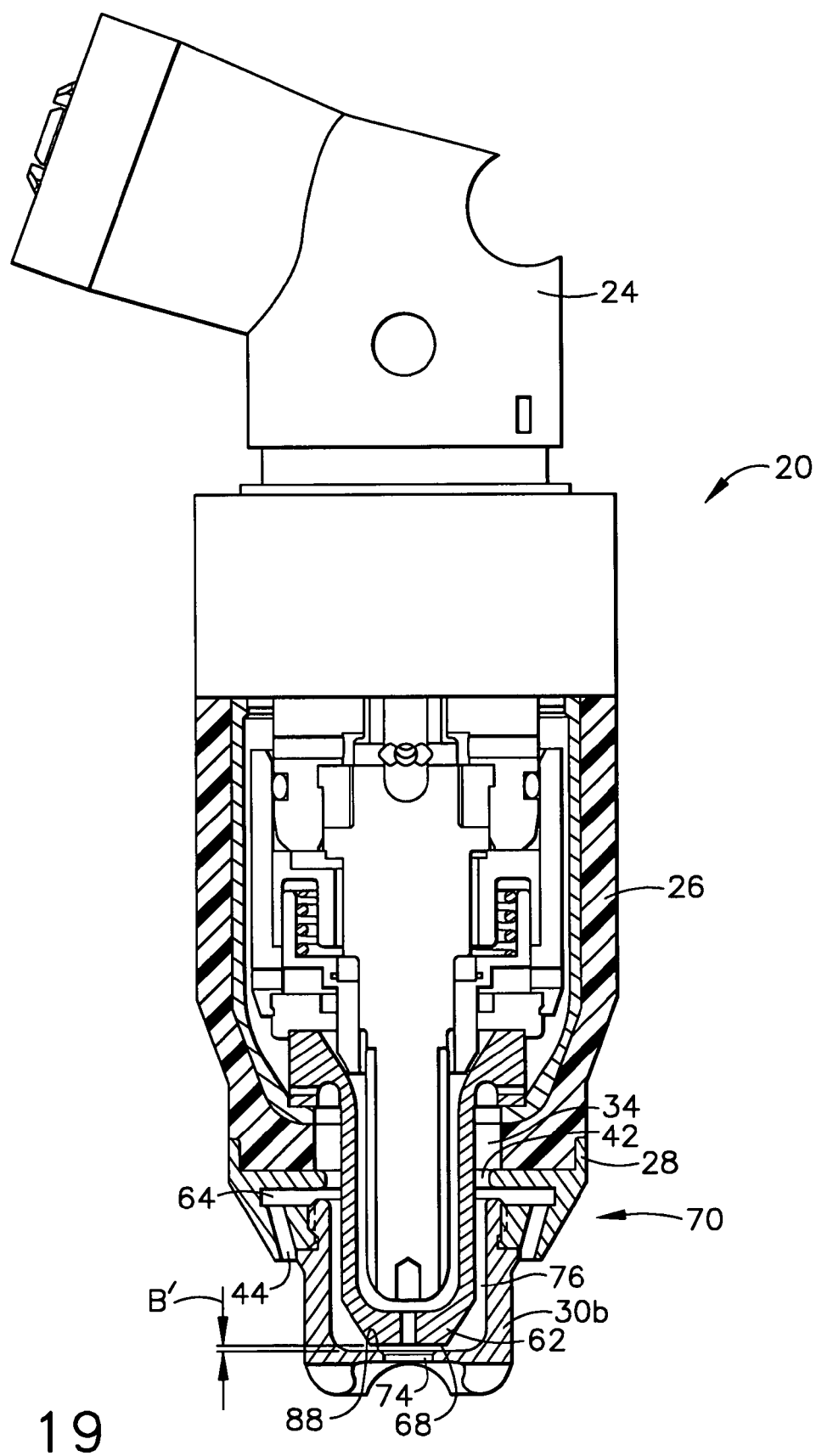
FIG. 19 is a partial sectional view of the second embodiment of the vented shield system with a drag cap secured to a torch head and constructed in accordance with the principles of the present invention.
Figure 20:
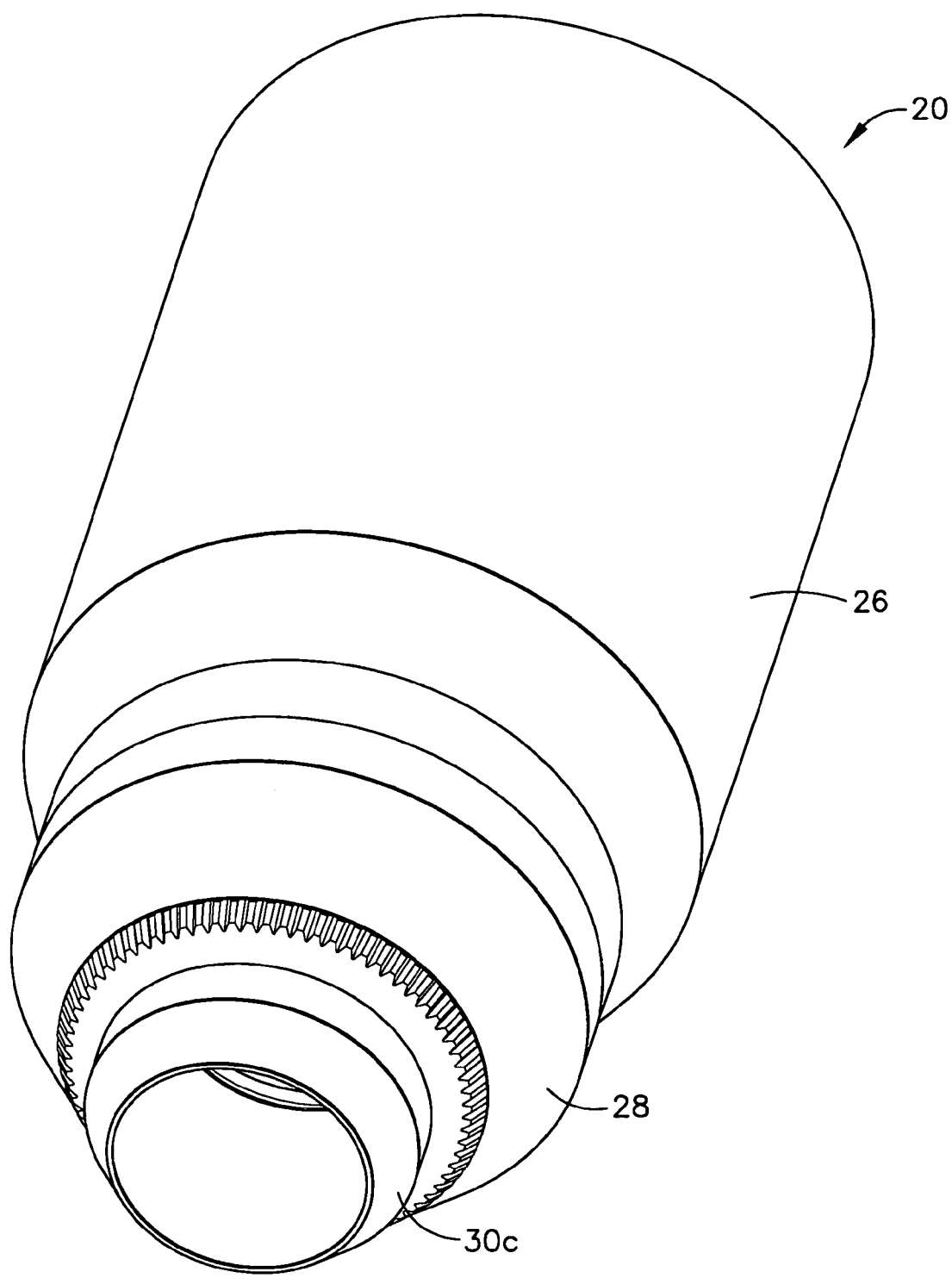
FIG. 20 is a perspective view of a third embodiment of the vented shield system with a gouging cap and constructed in accordance with the teachings of the present invention.
Figure 21:
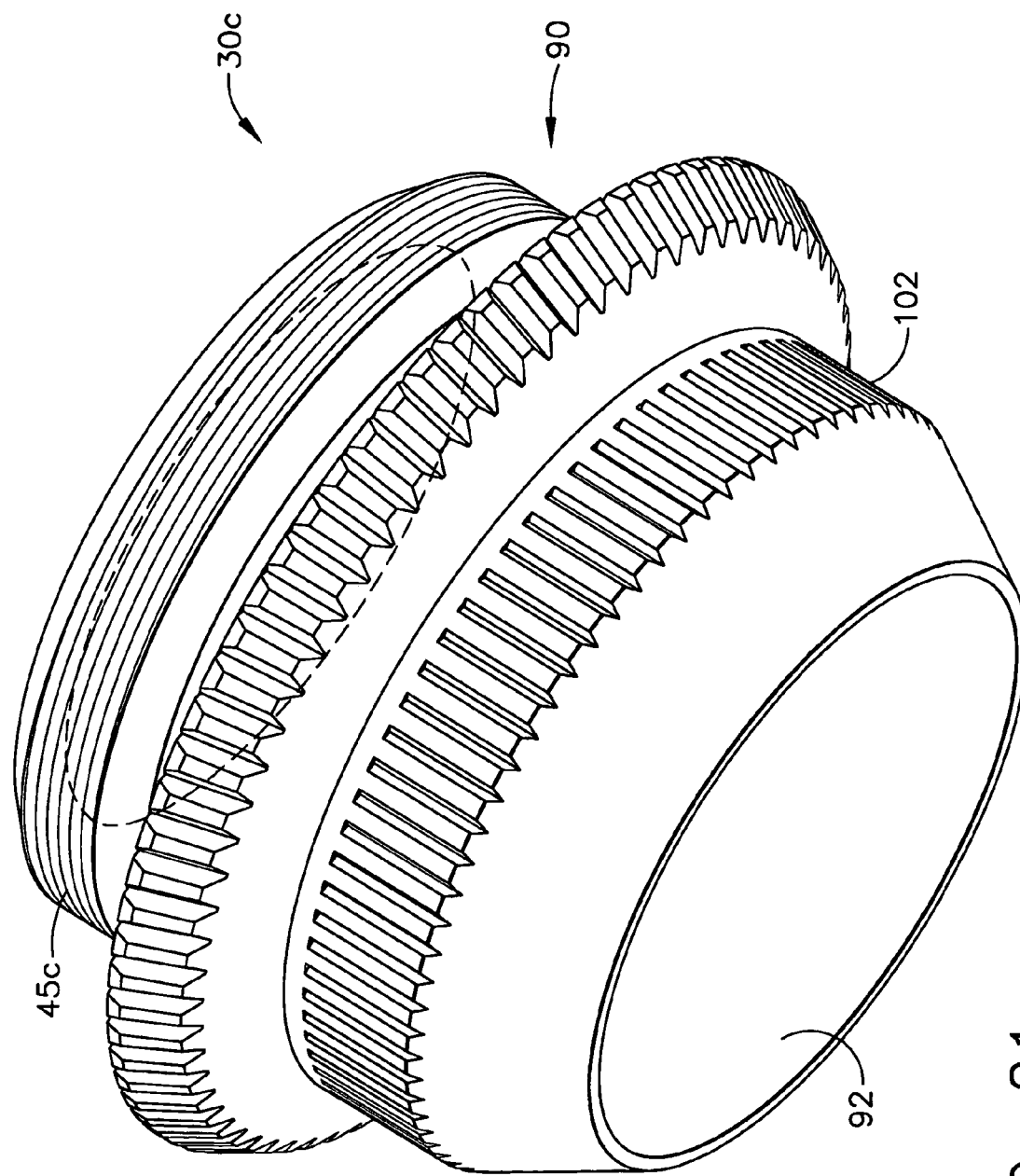
FIG. 21 is a perspective view of the gouging cap in accordance with the principles of the present invention.
Figure 22:
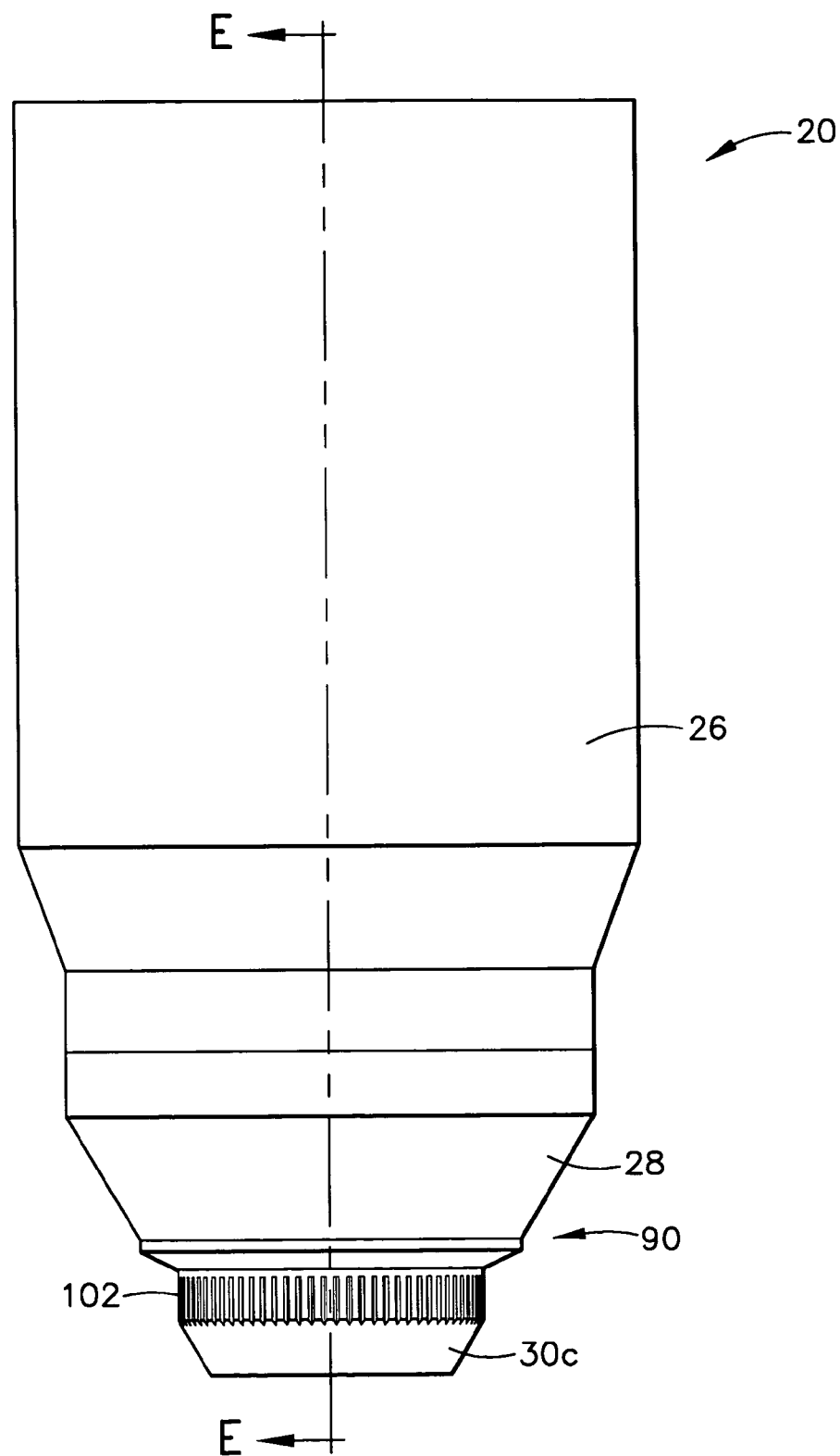
FIG. 22 is a side view of the third embodiment of the vented shield system with a gouging cap in accordance with the principles of the present invention.

Referring now to FIG. 19, the drag cap 30b is shown attached to the vented shield system 20, which is secured around a plasma arc torch head 24 having a plurality of consumables disposed therein. Among the consumables is the tip 62, which extends through the central opening 34 of the shield cup body 26, through the central opening 42 of the vented retainer 28, and into the central cavity 76 of the drag cap 30b. Accordingly, in operation, the drag cap 30b, along with the overall vented shield system 20, blocks molten metal from contacting the tip 62 and other consumables of the plasma arc torch.

As previously set forth, a portion of the secondary gas is directed into the annular undercut 64 of the vented retainer 28, and another portion is directed into the central cavity 76 of the drag cap 30b. The portion of secondary gas that flows into the annular undercut 64 is directed through the vent passageways 44, as a vent gas, and onto the drag cap 30a for improved cooling thereof. The other portion of secondary gas that flows into the central cavity 76 continues to flow distally and then through the central exit orifice 74 to stabilize the plasma stream during operation.

As shown in FIG. 19, the distance between the distal face 68 of the tip 62 and an internal face 88 of the drag cap 30b is defined by spacing B'. The spacing B' between the distal face 68 of the tip 62 and the internal face 88 of the mechanized cap 30b is critical and is a function of both an operating current level and a diameter of the central exit orifice 74 as described above in connection with the mechanized cap 30a.

Gouging Cap

Referring now to FIGS. 20 through 24, the gouging cap 30c is shown secured to the vented retainer 28 of the vented shield system 20. Generally, the gouging cap 30c is used in gouging applications where a portion of a workpiece is removed rather than completely cutting the workpiece. As shown, the gouging cap 30c comprises a proximal end portion 90 secured within the central opening 42 of the vented retainer 28. Preferably, the proximal end portion 90 defines external threads 45c that engage the internal threads 43 of the vented retainer 28 to secure the gouging cap 30c to the vented retainer 28. The gouging cap 30c further comprises a central exit orifice 92, which provides for the exit of a plasma stream and a secondary gas during operation of the plasma arc torch, and which also houses and protects certain consumable components of the plasma arc torch as described in greater detail below.

Figure 23:
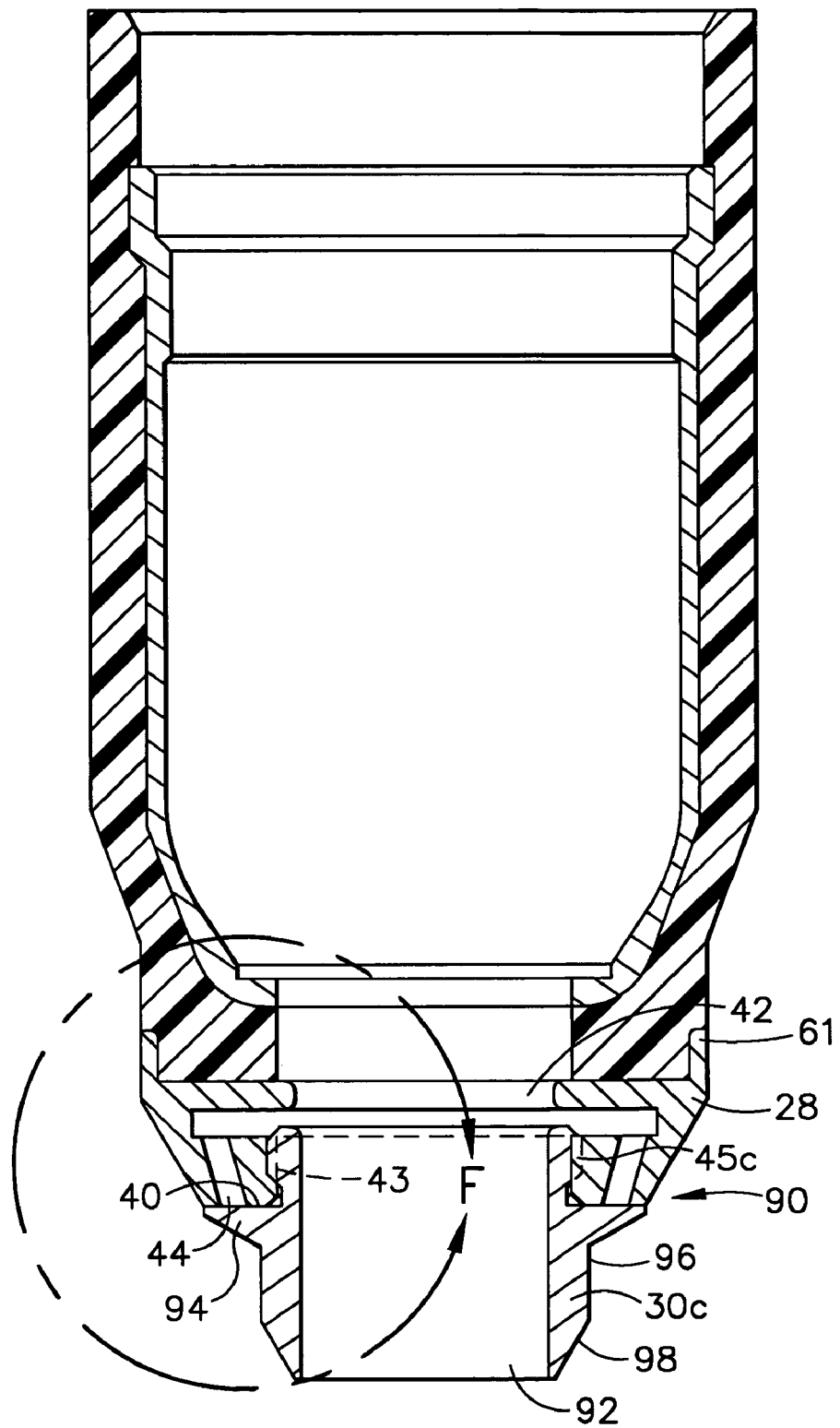
FIG. 23 is a cross-sectional view, taken along line E-E of FIG. 22, of the third embodiment of the vented shield system with a gouging cap in accordance with the teachings of the present invention.
Figure 24:
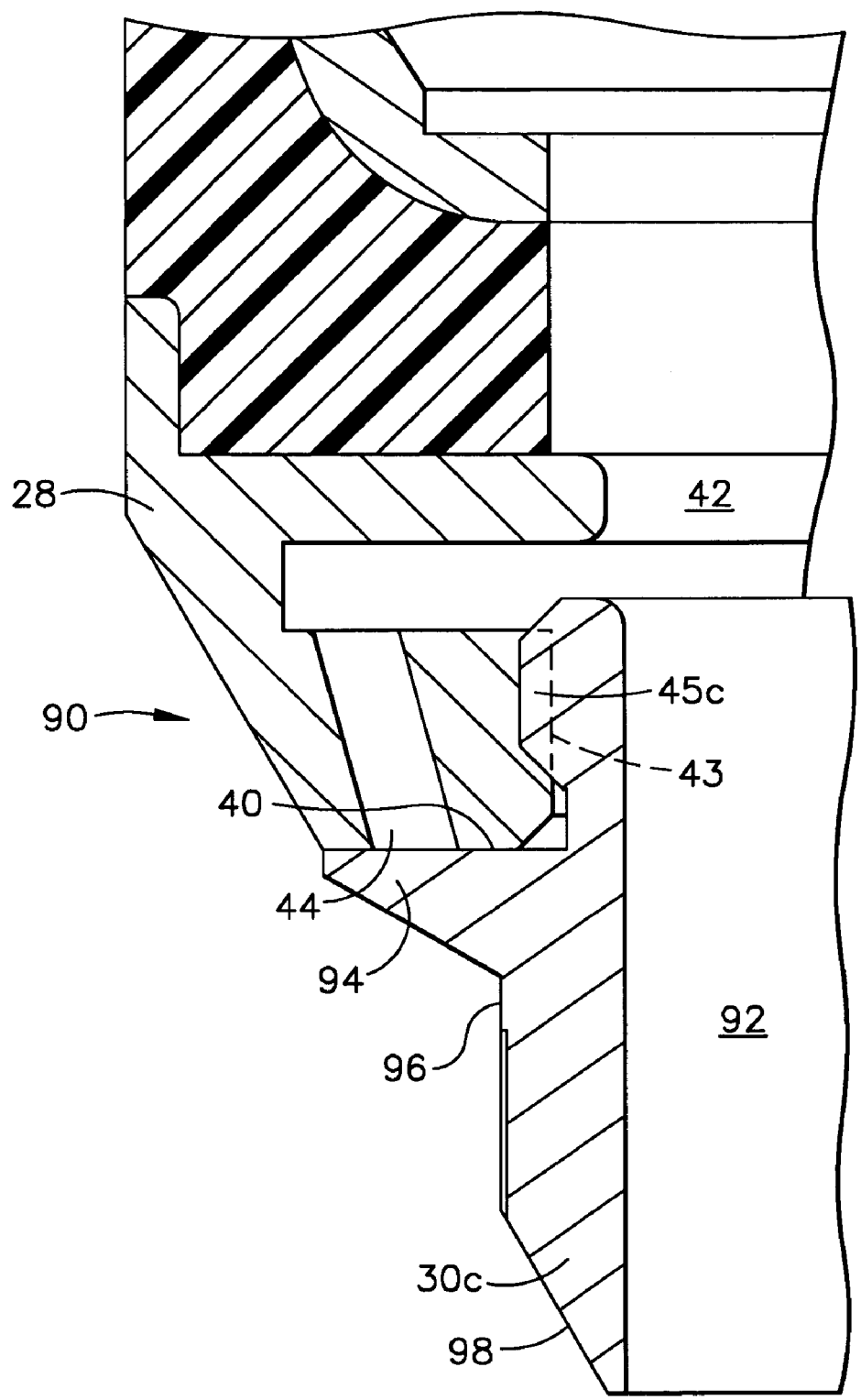
FIG. 24 is an enlarged detail view, taken from arrow F of FIG. 23, of the third embodiment of the vented shield system with a gouging cap in accordance with the principles of the present invention.

As best shown in FIGS. 23 and 24, the gouging cap 30c defines an external annular flange 94 formed around the proximal end portion 90. The external annular flange 94 abuts the distal face 40 of the vented retainer 28 and thus blocks the vent passageways 44, which blocks or redirects the vent gas. During gouging operations, the gouging cap 30c does not require additional cooling as with the shield caps previously described, and an additional volume of secondary gas is required to stabilize the plasma stream. Accordingly, the vent passageways 44 are blocked by the external annular flange 94 such that the secondary gas flows entirely through the central exit orifice 92 of the gouging cap 30c to stabilize the plasma stream.

As further shown, the gouging cap 30c defines an exterior wall portion 96 that transitions into an angled end wall 98 at a distal end portion 100. Accordingly, the angled end Wall 98 reduces the overall diameter of the gouging cap 30c, which allows an operator to use the plasma arc torch in more confined spaces. Additionally, the gouging cap 30c preferably defines a knurled surface 102 (best shown in FIGS. 20-22) to provide an improved gripping surface for attachment to the vented retainer 28. However, the gouging cap 30c may have a smooth surface or a different texture surface while remaining within the scope of the present invention.

Figure 25:
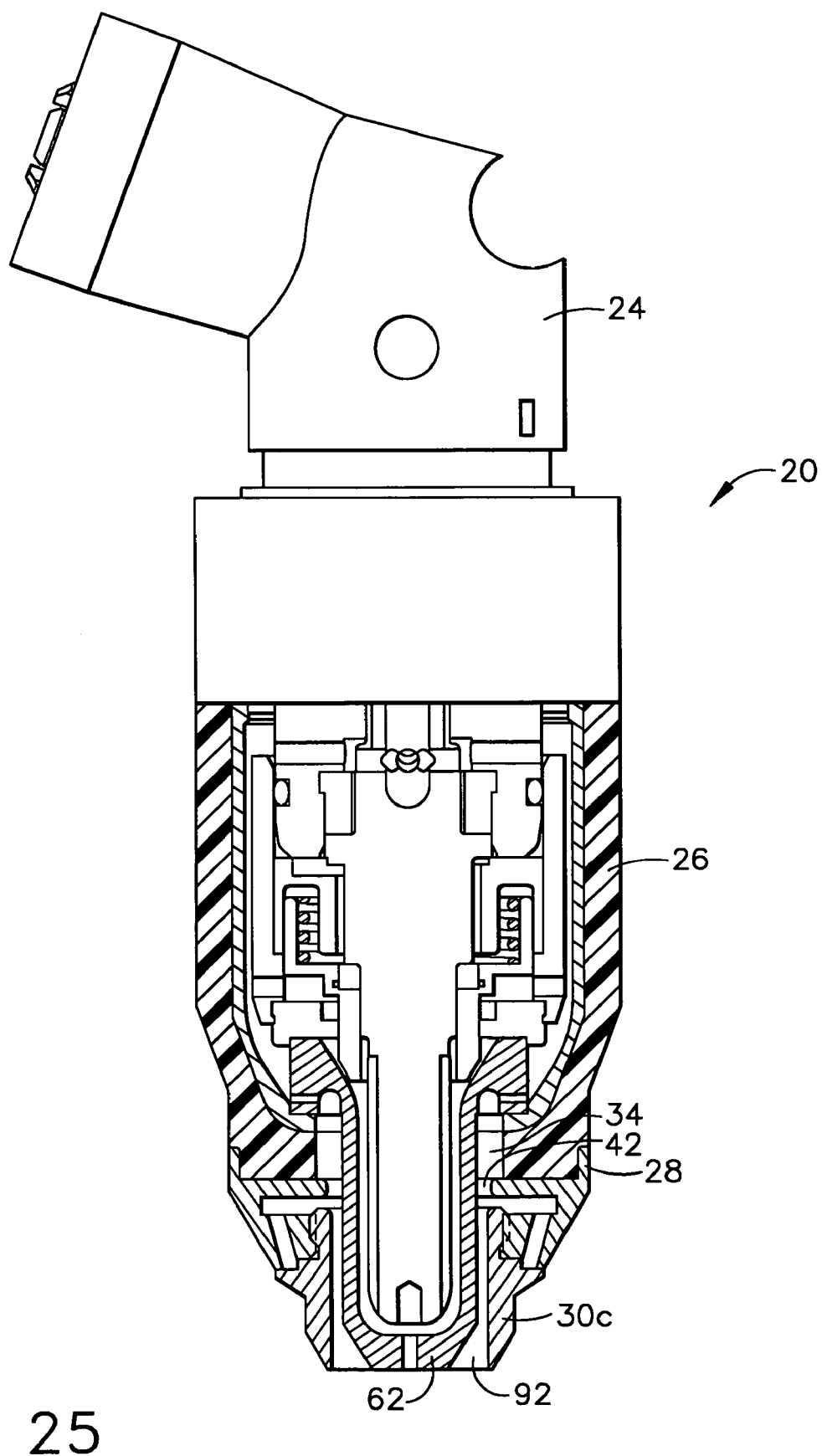
FIG. 25 is a partial sectional view of the third embodiment of the vented shield system with a gouging cap secured to a torch head and constructed in accordance with the principles of the present invention.
Figure 26:
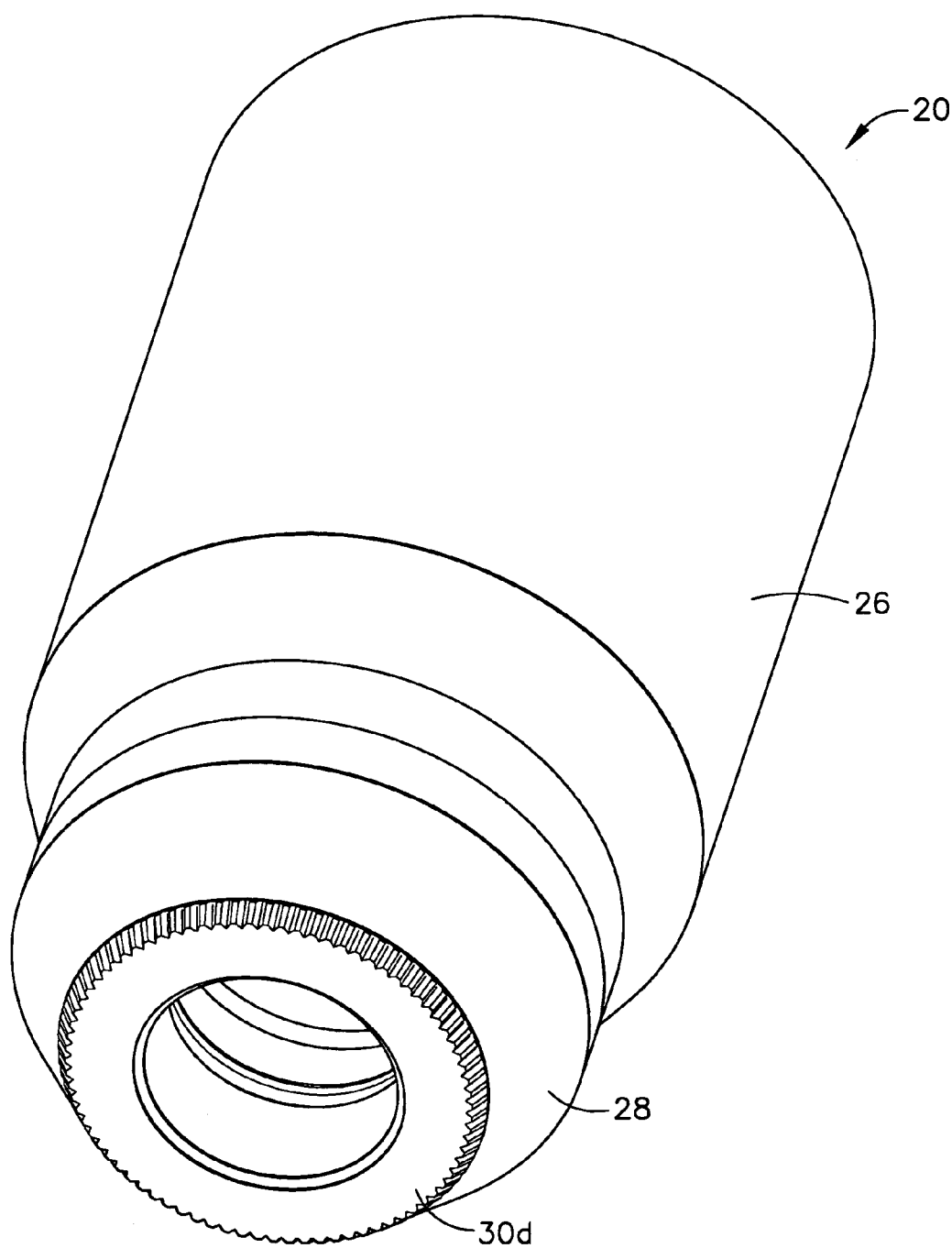
FIG. 26 is a perspective view of a fourth embodiment of the vented shield system with a deflector cap and constructed in accordance with the teachings of the present invention.
Figure 27:
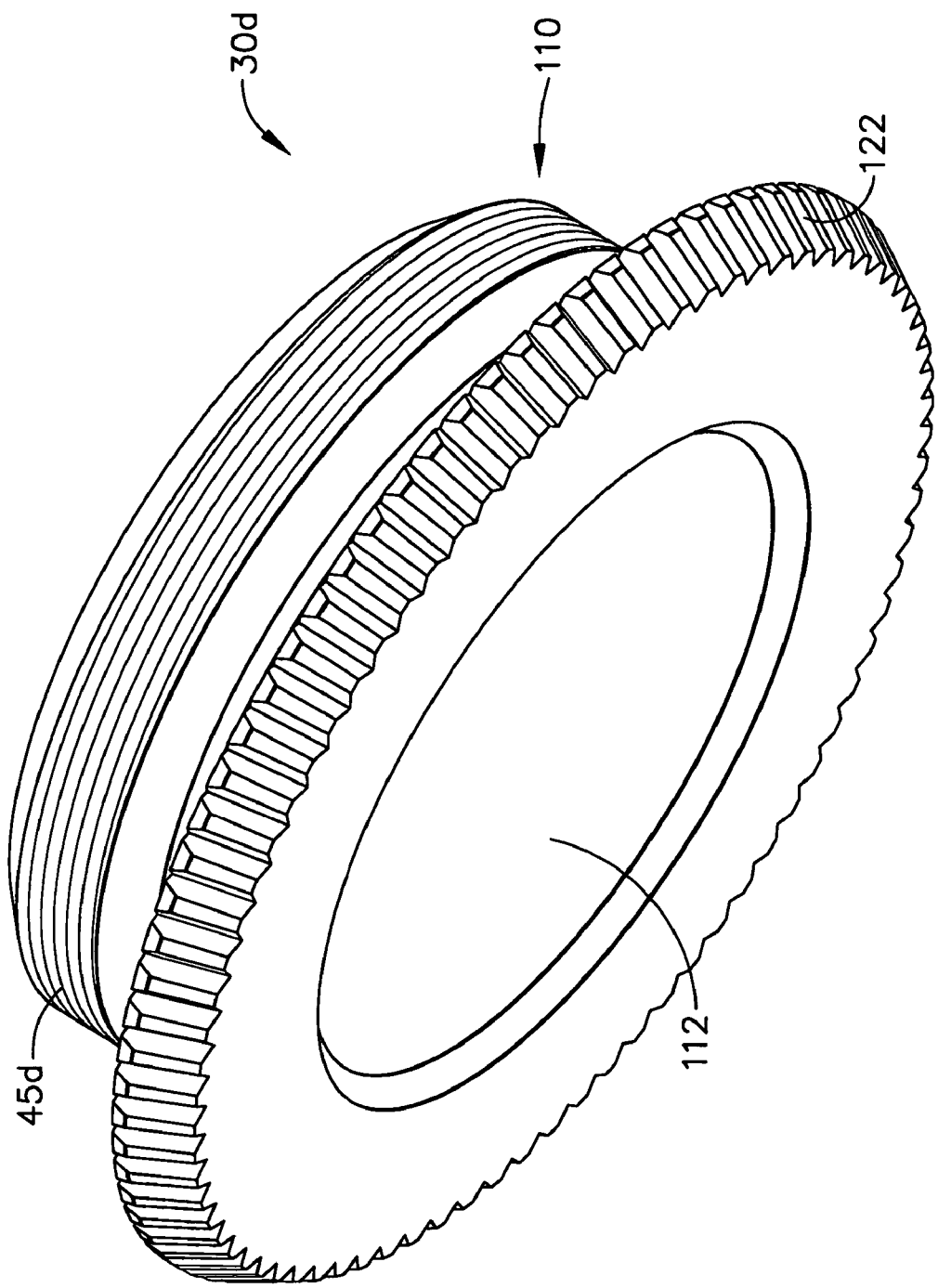
FIG. 27 is a perspective view of the deflector cap in accordance with the principles of the present invention.
Figure 28:
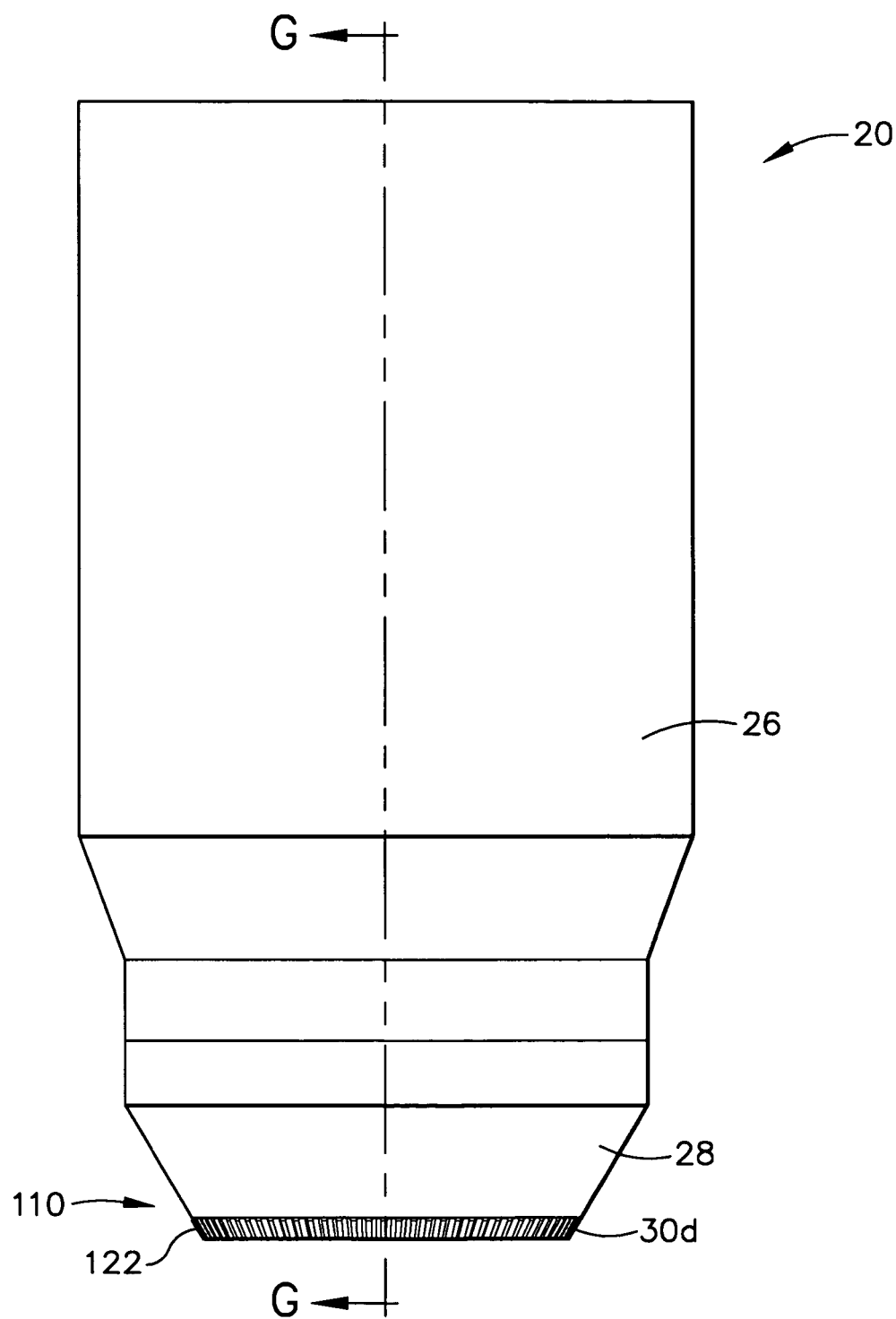
FIG. 28 is a side view of the fourth embodiment of the vented shield system with a deflector cap in accordance with the principles of the present invention.

Referring now to FIG. 25, the gouging cap 30c is shown attached to the vented shield system 20, which is secured around a plasma arc torch head 24 having a plurality of consumables disposed therein. Among the consumables is the tip 62, which extends through the central opening 34 of the shield cup body 26, through the central opening 42 of the vented retainer 28, and into the central exit orifice 92 of the gouging cap 30c. Accordingly, in operation, the gouging cap 30c, along with the overall vented shield system 20, blocks molten metal from contacting the tip 62 and other consumables of the plasma arc torch.

Deflector Cap

With reference to FIGS. 26 through 30, the deflector cap 30d is shown secured to the vented retainer 28 of the vented shield system 20. Generally, the deflector cap 30d is used in applications where the tip 62 (not shown) is partially exposed while a portion of the tip and other consumables are protected from molten metal by the vented shield system 20. A portion of the tip 62 is typically exposed so that the plasma arc torch can be operated closer to a workpiece and/or within a smaller work space. As shown, the deflector cap 30d comprises a proximal end portion 110 secured within the central opening 42 of the vented retainer 28. Preferably, the proximal end portion 110 defines external threads 45d that engage the internal threads 43 of the vented retainer 28 to secure the deflector cap 30d to the vented retainer 28. The deflector cap 30d further comprises a central exit orifice 112, which provides for the exit of a plasma stream and a secondary gas during operation of the plasma arc torch, and which also houses and protects certain consumable components of the plasma arc torch as described in greater detail below.

Figure 29:
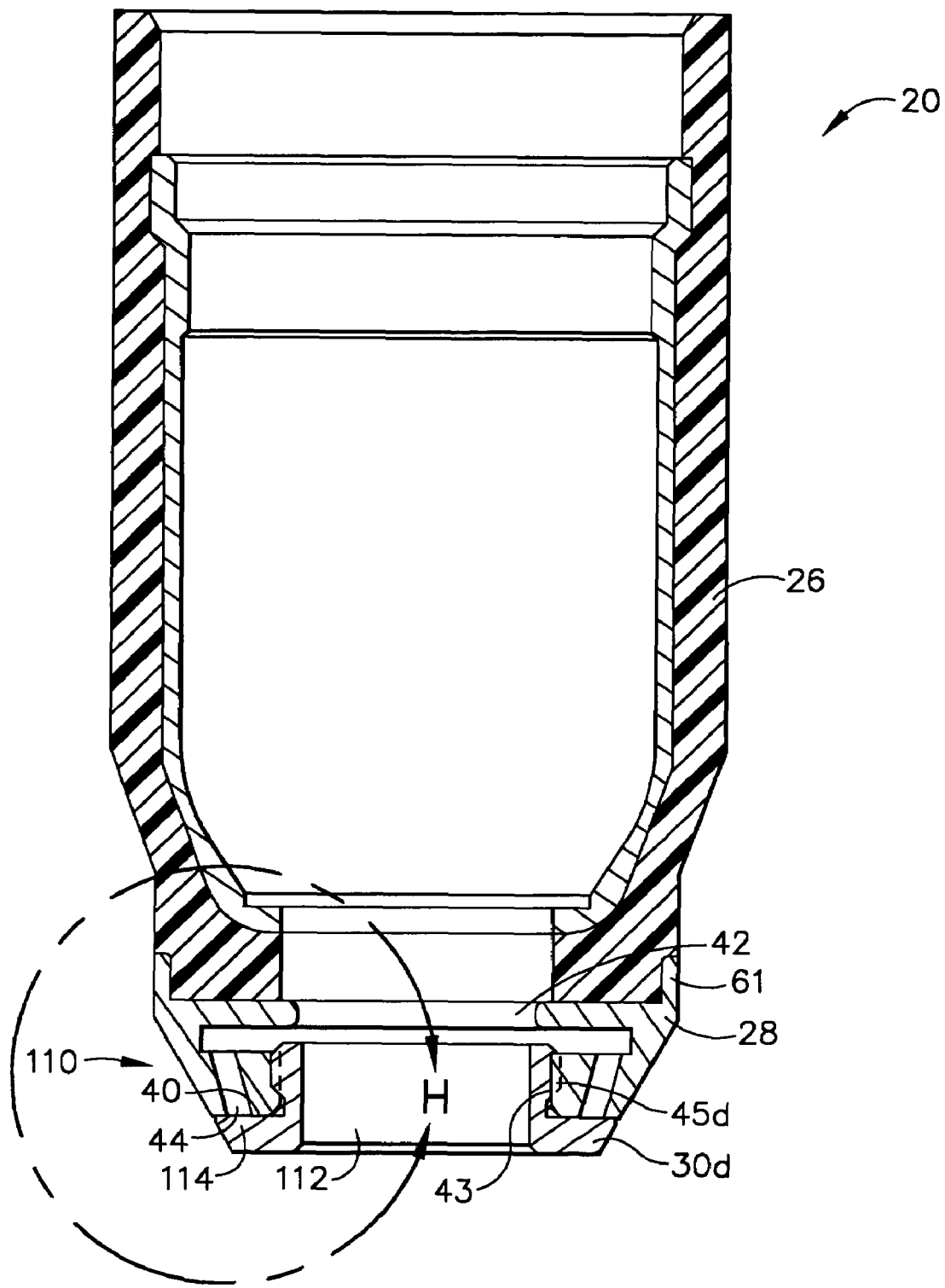
FIG. 29 is a cross-sectional view, taken along the plane of line G-G of FIG. 28, of the fourth embodiment of the vented shield system with a deflector cap in accordance with the teachings of the present invention.
Figure 30:
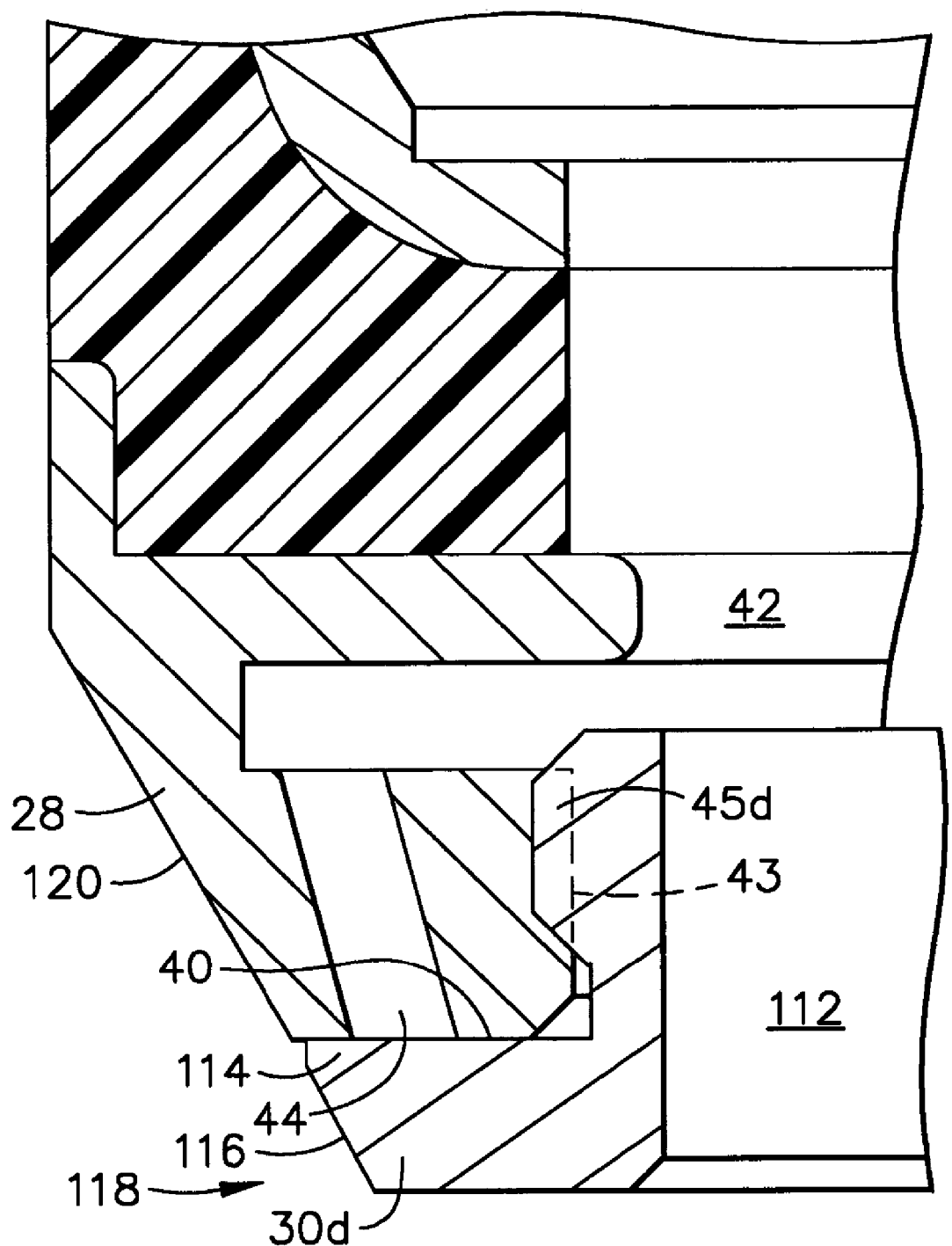
FIG. 30 is an enlarged detail view, taken from region H of FIG. 29, of the fourth embodiment of the vented shield system having a deflector cap in accordance with the principles of the present invention.

As best shown in FIGS. 29 and 30, the deflector cap 30d defines an external annular flange 114 formed around the proximal end portion 110. The external annular flange 114 abuts the distal face 40 of the vented retainer 28 and thus blocks the vent passageways 44, which blocks or redirects the vent gas. During cutting operations, the deflector cap 30d does not require additional cooling as with the shield caps previously described, and an additional volume of secondary gas is required to stabilize the plasma stream. Accordingly, the vent passageways 44 are blocked by the external annular flange 114 such that the secondary gas flows entirely through the central exit orifice 112 of the deflector cap 30d to stabilize the plasma stream.

As further shown, the deflector cap 30d defines an angled end wall 116 at a distal end portion 118. The angled end wall 116 is aligned with an angled sidewall 120 of the vented retainer 28, which reduces the overall diameter of the vented shield system 20, thereby allowing an operator to use the plasma arc torch in more confined spaces. Additionally, the angled end wall 116 of the deflector cap 30d preferably defines a knurled surface 122 (best shown in FIGS. 26-28) to provide an improved gripping surface for attachment to the vented retainer 28. However, the deflector cap 30d may have a smooth surface or a different texture surface while remaining within the scope of the present invention.

Figure 31:
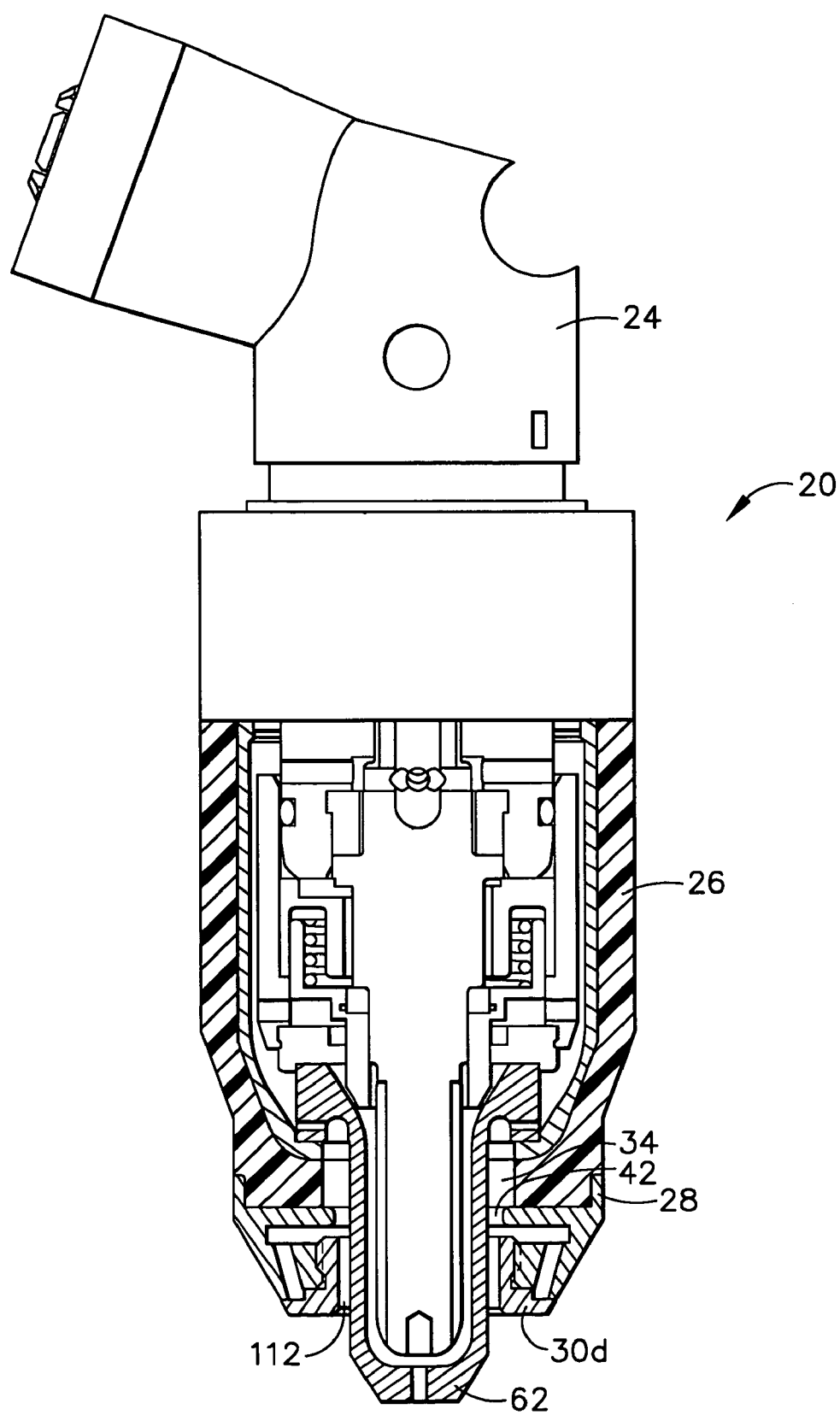
FIG. 31 is a partial sectional view of the fourth embodiment of the vented shield system with a deflector cap secured to a torch head and constructed in accordance with the principles of the present invention.

Referring now to FIG. 31, the deflector cap 30d is shown attached to the vented shield system 20, which is secured around a plasma arc torch head 24 having a plurality of consumables disposed therein. Among the consumables is the tip 62, which extends through the central opening 34 of the shield cup body 26, through the central opening 42 of the vented retainer 28, and partially through the central exit orifice 112 of the deflector cap 30d. Accordingly, in operation, the deflector cap 30d, along with the overall vented shield system 20, blocks molten metal from contacting the tip 62 and other consumables of the plasma arc torch.

Figure 32:
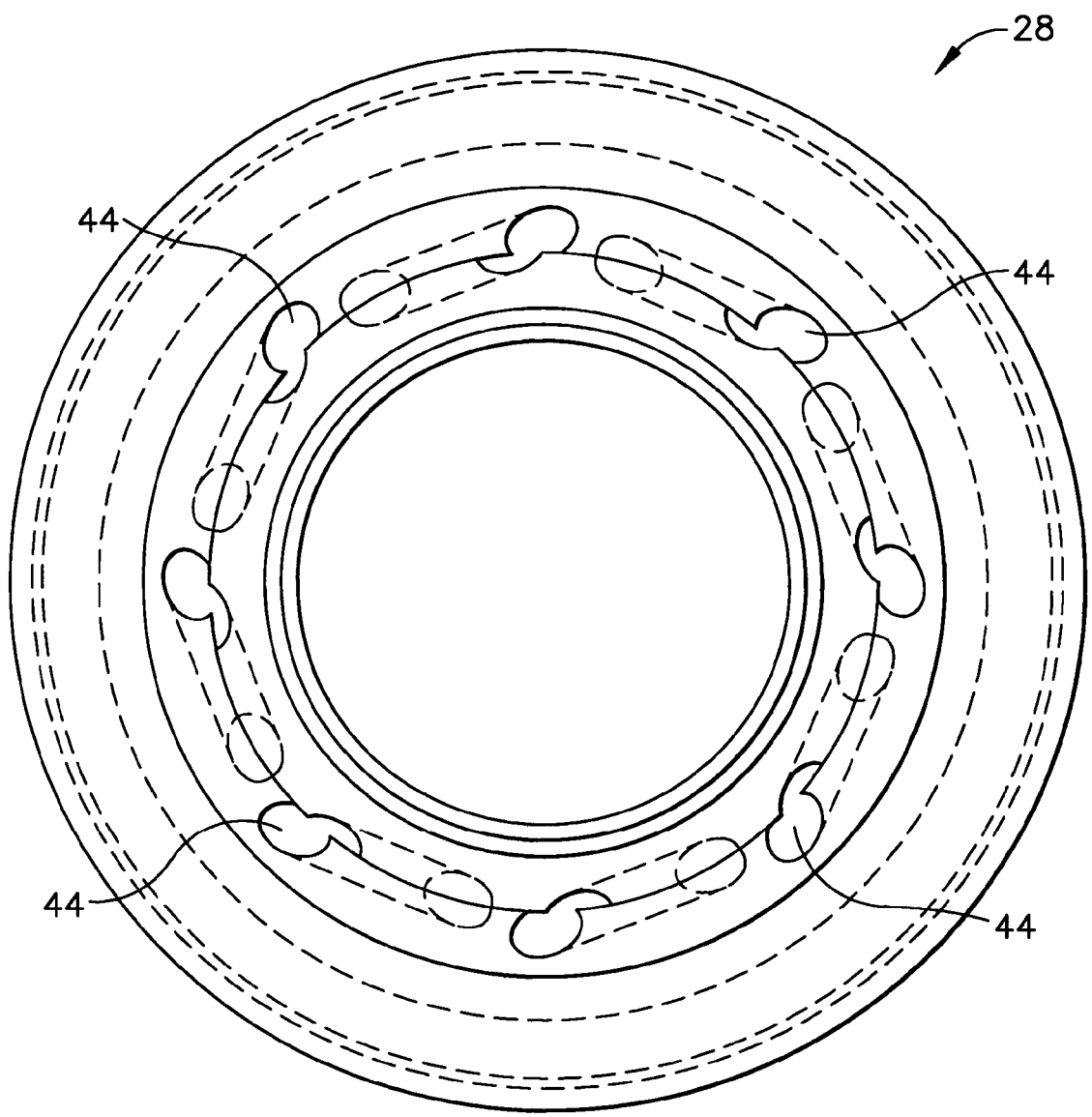
FIG. 32 is a bottom plan view of an alternate embodiment of the vented retainer wherein the vent passageways are canted in accordance with the principles of the present invention.

In yet another form of the present invention, the vent passageways 44 formed through the vented retainer 28 are canted as shown in FIG. 32 in order to provide a swirling motion to the vent gas. Therefore, greater cooling of the shield cap 30 (not shown) may be achieved when the vent gas is swirled through the canted vent passageways 44 according to the alternate form of the present invention.

Figure 33:
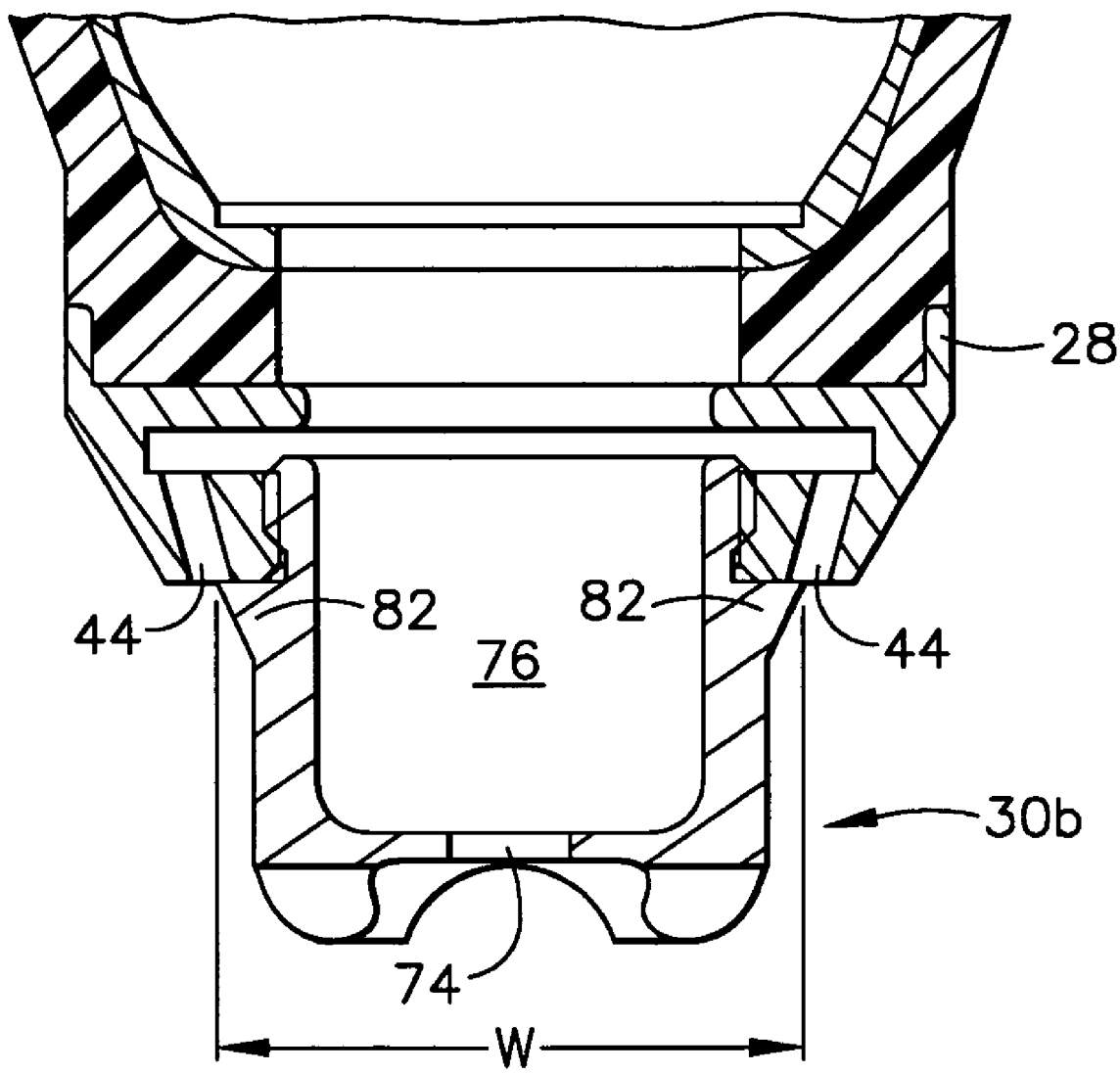
FIG. 33 is a cross-sectional view of an external annular flange of a shield cap that is used to meter the amount of secondary gas flow in accordance with the principles of the present invention.

Referring to FIG. 33, another form of the present invention is illustrated, wherein the external annular flange 82 is used to meter the amount of secondary gas that flows through the central exit orifice 74. The drag cap 30b is shown in FIG. 33 to illustrate such metering, however, the metering function may also be provided by the mechanized cap 30a, the gouging cap 30c, and the deflector cap 30d with each of the respective external annular flanges, 56, 82, 94, and 114 as previously described. As shown, the external annular flange 82 defines a width W, which is preferably sized to either redirect at least a portion of the vent gas that flows through the vent passageways 44 or to not redirect the vent gas at all. As previously described, the external annular flange 82 allowed substantially all of the vent gas to flow through the vent passageways 44 (mechanized cap 30a and drag cap 30b) or to block or redirect substantially all of the vent gas (gouging cap 30c and deflector cap 30d). In the alternate embodiment shown in FIG. 33, the external annular flange 82 redirects a portion but not all of the secondary gas flowing to the vent passageways 44 when the width W extends adjacent the vent passageways 44 as shown. Accordingly, a portion of the secondary gas is redirected to flow through the central cavity 76 and through the central exit orifice 74, while another portion flows through the vent passageways 44 as the vent gas. As a result, the amount of secondary gas that exits the drag cap 30b can also be controlled by varying the width W of the external annular flange 82 to block a portion of the vent passageway 44 as shown.

Throughout the four applications of the shield cap 30 as described herein (mechanized 30a, drag 30b, gouging 30c, and deflector 30d), the amount of secondary gas flowing through the plasma arc torch 10/12 (not shown) is preferably constant and the vented retainer 28 preferably remains the same and is not changed for each cutting application. Therefore, by changing the width W of the respective external annular flange (56, 82, 94, and 114) and/or the size of the central exit orifice (52, 74, 92, 112), the amount of secondary gas exiting the plasma arc torch 10/12 can be controlled as a function of the specific cutting application.

In another form of the present invention, a method of operating a plasma arc torch is provided that comprises the steps of directing a flow of vent gas inward, through a first component of the plasma arc torch and toward a second component of the plasma arc torch, and blocking at least a portion of molten metal from contacting components of the plasma arc torch using at least the second component. Preferably, the first component is the vented retainer 28 and the second component is one of the shield caps 30 as previously described. Additionally, the method may further comprise the step of directing another portion of secondary gas away from a plasma stream using the second component.

Accordingly, a vented shield system 20 is provided that vents a vent gas inward to improve cooling in certain applications and that accommodates a plurality of different shield caps 30 without removing or replacing the vented retainer 28. The vented shield system 20 provides for interchangeability of shield caps 30, depending on the operation being performed by the plasma arc torch, without removal of the vented retainer 28 that comprises the vent passageways 44 for venting a portion of the secondary gas as a vent gas. Additionally, the shield caps 30 are relatively small in size compared to shields in the known art and are therefore less expensive to replace. As a result, the same vented retainer 28 is used throughout a variety of plasma arc torch applications while only the shield caps 30 are replaced due to wear or when different operations (e.g., drag cutting or gouging) are being performed with the plasma arc torch.

As used herein, a plasma arc torch, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A shield cap for use in a plasma arc torch comprising:
   a proximal end portion comprising a flange, the flange defining a width; and
   a central exit orifice disposed distally from the flange,
   wherein the flange width is sized to redirect at least a portion of a vent gas, or to not redirect the vent gas at all, that flows through a vent passageway formed through an adjacent component of the plasma arc torch to meter the amount of vent gas that flows through the central exit orifice.

2. The shield cap according to claim 1, wherein the proximal end portion comprises an external attachment area that defines threads.

3. A method of operating a plasma arc torch wherein a flow of vent gas for one mode of operation is redirected to accommodate another mode of operation, wherein the one mode and the another mode are at least two of a mechanized cutting mode, a drag cutting mode, a gouging mode, and cutting with a deflector cap mode.

4. The method according to claim 3, wherein the flow of vent gas is redirected by a shield cap.

5. A plurality of interchangeable shield caps for use in a plurality of operating modes, the shield caps adapted to engage an adjacent component of a plasma arc torch to direct a flow of vent gas without removing a vent passageway disposed in the adjacent component of the plasma arc torch, wherein the shield caps comprise:
   a proximal end portion comprising a flange, the flange defining a width; and
   a central exit orifice disposed distally from the flange,
   wherein the flange width is sized to redirect at least a portion of a vent gas, or to not redirect the vent gas at all, that flows through a vent passageway formed through an adjacent component of the plasma arc torch to meter the amount of vent gas that flows through the central exit orifice.

6. A method of operating a plasma arc torch, wherein a spacing from an internal face of a shield cap to an adjacent component of a plasma arc torch is varied as a function of current level and a diameter of a central exit orifice of a tip of the plasma arc torch.

7. A method of operating a vented shield system in a torch comprising interchanging a plurality of shield caps for a corresponding plurality of modes of operation, wherein the plurality of modes of operation are at least two of a mechanized cutting mode, a drag cutting mode, a gouging mode, and a cutting with a deflector cap mode, without removing a vent passageway from a consumable component of the torch.

* * * * *